US012448270B2

(12) United States Patent
Garton

(10) Patent No.: US 12,448,270 B2
(45) Date of Patent: Oct. 21, 2025

(54) REFUELING STATION PROTECTIVE DOOR COVER

(71) Applicant: Garton Enterprise, LLC, Dickson, TN (US)

(72) Inventor: Misty Garton, Dickson, TN (US)

(73) Assignee: Garton Enterprise, LLC, Dickson, TN (US)

( * ) Notice: Subject to any disclaimer, the term of this patent is extended or adjusted under 35 U.S.C. 154(b) by 325 days.

(21) Appl. No.: 18/167,501

(22) Filed: Feb. 10, 2023

(65) Prior Publication Data

US 2023/0249958 A1 Aug. 10, 2023

Related U.S. Application Data

(60) Provisional application No. 63/308,716, filed on Feb. 10, 2022.

(51) Int. Cl.
*B67D 7/06* (2010.01)

(52) U.S. Cl.
CPC .................................... *B67D 7/06* (2013.01)

(58) Field of Classification Search
CPC ........................................................ B67D 7/06
USPC .......................................... 141/97; 296/97.22
See application file for complete search history.

(56) References Cited

U.S. PATENT DOCUMENTS 2,524,509 A 10/1950 Barney
4,106,609 A * 8/1978 Kaspar ..................... G07F 9/10 194/247
5,083,846 A 1/1992 Day, Jr. et al.
5,990,874 A * 11/1999 Tsumura ............... G06F 1/1626 382/187
6,167,922 B1 1/2001 Seitz et al.
6,184,846 B1 * 2/2001 Myers ...................... H01Q 1/22 141/351

(Continued)

FOREIGN PATENT DOCUMENTS

CN 210001578 U 1/2020
CN 212893886 U 4/2021

OTHER PUBLICATIONS

ALCO Industrial Covers. (n.d.). Gas Station Pump Covers. Retrieved from https://www.alcocovers.com/speciality-covers/gas-station-pump-covers/.

(Continued)

*Primary Examiner* — Paul R Durand
*Assistant Examiner* — Michael J. Melaragno
(74) *Attorney, Agent, or Firm* — Holland & Knight LLP; Matthew C. Cox; Forrest S. Tinnin

(57) ABSTRACT

A refueling station protective door cover apparatus may include a station top cover, including a substantially flat surface disposable over a top portion of a refueling station. The apparatus may include a top door shield disposable on a first perimeter of the station top cover, and the top door shield may include a raised shield. The apparatus may include a button cover disposable over a grade selection area of the refueling station. The button cover may include a substantially flat surface and one or more button protectors disposed in the substantially flat surface of the button cover. The apparatus may include an upper display cover disposable over a first display screen of the refueling station. The apparatus may include a selection display cover disposable over a second display screen of the refueling station.

17 Claims, 27 Drawing Sheets

(56) References Cited

U.S. PATENT DOCUMENTS

| | | | | |
|---|---|---|---|---|
| 2007/0109068 | A1 | 5/2007 | Smith et al. | |
| 2007/0144604 | A1 | 6/2007 | Michael | |
| 2014/0234615 | A1 | 8/2014 | Meng | |
| 2023/0249958 | A1 * | 8/2023 | Garton | B67D 7/06 222/173 |

OTHER PUBLICATIONS

Airframes Alaska. (n.d.). Insulated Covers. Retrieved from https://www.airframesalaska.com/category-s/2009.htm.

International Search Report and Written Opinion issued for PCT/US2023/062389, dated May 26, 2023.

* cited by examiner

REFUELING STATION PROTECTIVE DOOR COVER

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims priority to U.S. Provisional Patent Application No. 63/308,716, entitled "REFUELING STATION PROTECTIVE DOOR COVER," filed on Feb. 10, 2022, which is pending. The entirety of this application is incorporated by reference.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE DISCLOSURE

The present disclosure generally relates to refueling stations, and more particularly to refueling station protective door covers and dispensers.

Refueling stations—including gasoline pumps, petroleum dispensers, compressed natural gas (CNG) pumps, and electronic vehicle (EV) charging stations—have many opportunities to become damaged. Damage may occur during transportation (for example, between the place of manufacture and the site where the refueling station will be used), while the refueling station is located outside (for example, by vehicles, the elements, vandalism, etc.), or during other times. Repairing damaged refueling stations can be expensive, time-consuming, and may lead to unwanted downtime.

What is needed then is a refueling station protective door cover.

BRIEF SUMMARY

This Brief Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One aspect of the disclosing includes a refueling station protective door cover apparatus. The refueling station protective door cover apparatus may include a station top cover, including a substantially flat surface disposable over a top portion of a refueling station. The apparatus may include a top door shield disposable on a first perimeter of the station top cover, and the top door shield may include a raised shield. The apparatus may include a button cover disposable over a grade selection area of the refueling station. The button cover may include a substantially flat surface and one or more button protectors disposed in the substantially flat surface of the button cover. The apparatus may include an upper display cover disposable over a first display screen of the refueling station. The apparatus may include a selection display cover disposable over a second display screen of the refueling station.

Another aspect of the disclosing includes another refueling station protective door cover apparatus. The apparatus may include a station top cover, including a substantially flat surface disposable over a top portion of a refueling station. The refueling station may include a first side and a second side disposed opposite the first side. The apparatus may include a first top door shield disposable on a first side of a perimeter of the station top cover. The first side of the perimeter of the station top cover may be disposed proximate the first side of the refueling station. The first top door shield may include a first raised shield. The apparatus may include a second top door shield disposable on a second side of the perimeter of the station top cover. The second side of the perimeter of the station top cover may be disposed proximate the second side of the refueling station. The second top door shield may include a second raised shield. The apparatus may include a first button cover disposable over a grade selection area of the first side of the refueling station. The first button cover may include a substantially flat surface. The first button cover may include one or more button protectors disposed in the substantially flat surface of the first button cover. The apparatus may include a second button cover disposable over a grade selection area of the second side of the refueling station. The second button cover may include a substantially flat surface and one or more button protectors disposed in the substantially flat surface of the second button cover. The apparatus may include a first upper display cover disposable over a first display screen disposed on the first side the refueling station. The apparatus may include a second upper display cover disposable over a first display screen disposed on the second side the refueling station. The apparatus may include a first selection display cover disposable over a second display screen of the first side of the refueling station. The apparatus may include a second selection display cover disposable over a second display screen of the second side of the refueling station.

Another aspect of the disclosure may include a method for assembling a refueling station protective door cover apparatus. The method may include disposing a station top cover over a top portion of a refueling station. The station top cover may include a substantially flat surface. The method may include disposing a top door shield on a perimeter of the station top cover. The top door shield may include a raised shield. The method may include disposing a button cover over a grade selection area of the refueling station. The button cover may include a substantially flat surface and one or more button protectors disposed in the substantially flat surface of the button cover. The method may include disposing an upper display cover over a first display screen of the refueling station. The upper display cover may include a first display protector disposed in a central portion of the upper display cover. The method may include disposing a selection display cover over a second display screen of the refueling station. The selection display cover may include a second display protector disposed in a central portion of the upper display cover.

Numerous other objects, advantages and features of the present disclosure will be readily apparent to those of skill in the art upon a review of the following drawings and description of various embodiments.

DETAILED DESCRIPTION

Figure 1:
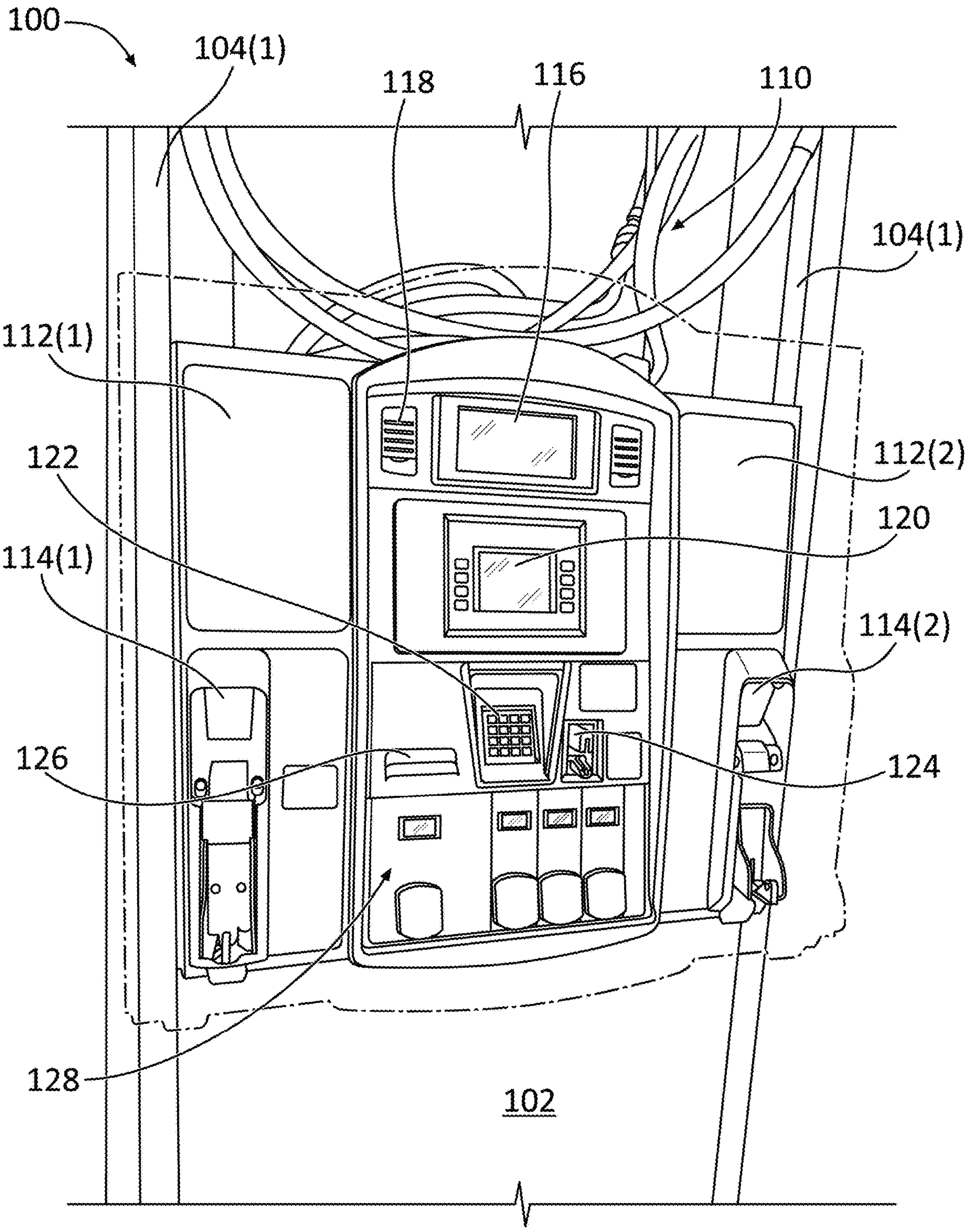
FIG. 1 is a perspective view illustrating one embodiment of a refueling station.

While the making and using of various embodiments of the present disclosure are discussed in detail below, it should be appreciated that the present disclosure provides many applicable inventive concepts that are embodied in a wide variety of specific contexts. The specific embodiments discussed herein are merely illustrative of specific ways to make and use the disclosure and do not delimit the scope of the disclosure. Those of ordinary skill in the art will recognize numerous equivalents to the specific apparatus and methods described herein. Such equivalents are considered to be within the scope of this disclosure and are covered by the claims.

In the drawings, not all reference numbers are included in each drawing, for the sake of clarity. In addition, positional terms such as "upper," "lower," "side," "top," "bottom," etc. refer to the apparatus when in the orientation shown in the drawing. A person of skill in the art will recognize that the apparatus can assume different orientations when in use.

Reference throughout this specification to "one embodiment," "an embodiment," "another embodiment," or similar language means that a particular feature, structure, or characteristic described in connection with the embodiment is included in at least one embodiment. Thus, appearances of the phrases "in one embodiment," "in an embodiment," "in some embodiments," and similar language throughout this specification may, but do not necessarily, all refer to the same embodiment, but mean "one or more but not necessarily all embodiments" unless expressly specified otherwise.

The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. As used herein, the term "a," "an," or "the" means "one or more" unless otherwise specified. The term "or" means "and/or" unless otherwise specified. The term "substantially flat surface" may include a surface whose gradient when laid on a flat surface is not more than 5% in any particular portion.

FIG. 1 depicts one embodiment of a refueling station 100. The refueling station 100 may include a gasoline pump, a petroleum dispenser, a compressed natural gas (CNG) pump, an electronic vehicle (EV) charging station, or some other type of refueling station for a vehicle. The refueling station 100 may include a pump skirt 102. The refueling station 100 may include a valance (not depicted in FIG. 1) disposed above. The refueling station 100 may include one or more risers 104(1)-(2) which may support the valance above the pump skirt 102 and other components of the refueling station 100.

The refueling station 100 may include a door 110. The door 110 may connect to other components of the refueling station 100 via a hinge or other connection mechanism. The door 110 may swing open to reveal the interior of the refueling station 100. The door 110 may include one or more components of the refueling station 100.

In one embodiment, the door 110 may include one or more graphic portions 112(1)-(2). A graphic portion 112 may include a flat area where one or more stickers, decals, or other materials may be disposed. The door 110 may include one or more nozzle holders 114(1)-(2). A nozzle holder 114 may include an area where a user may dispose a fuel pump nozzle when not in use. The door 110 may include a first display screen 116. The first display screen 116 may include a screen that displays information such as a number of gallons dispensed by the refueling station 100, a total cost of the fuel dispensed, or other information.

The door 110 may include a speaker 118. The speaker 118 may include a speaker electronically connected to an audio system. The audio system may include a public address (PA) system (for example, so that a user of the pump can communicate with an attendant that has a microphone that is connected to the PA system), a system connected to a television disposed in the refueling station 100, or some other audio system.

In one embodiment, the door 110 may include a second display screen 120. The second display screen 120 may display information on the refueling station 100. The second display screen 120 may display information prompting the user of the refueling station 100 to carry out the steps of using the refueling station 100 or may display other information. In some embodiments, the second display screen 120 may include a touchscreen. The second display screen 120 may include one or more buttons disposed around the second display screen 120. A user may use the one or more buttons to interact with the second display screen 120 or the refueling station 100.

The door 110 may include a keypad 122. The keypad 122 may include one or more keys or buttons that may be connected to an electronic system of the refueling station 100. A user of the refueling station 100 may use the keypad 122 to input information into the refueling station 100 (for example, a personal identification number (PIN), a ZIP code, a "yes" or a "no," etc.).

In some embodiments, the door 110 may include a payment receiver 124. The payment receiver 124 may include a card reader, a cash slot, a coin slot, a wireless communications reader (for example, a radio-frequency identification (RFID) reader or a near-field communication (NFC) reader), or other mechanism that accepts payment. In one embodiment, the door 110 may include a printer 126. The printer 126 may include a slot that dispenses paper, such as a receipt.

In one or more embodiments, the door 110 may include a grade selection area 128. The grade selection area 128 may include one or more grade buttons and one or more corresponding price displays. A grade button may allow a user of the refueling station 100 to select the grade of the fuel (or some other aspect of the fuel) desired, and the corresponding price display may display the price of that grade of fuel.

Figure 2:
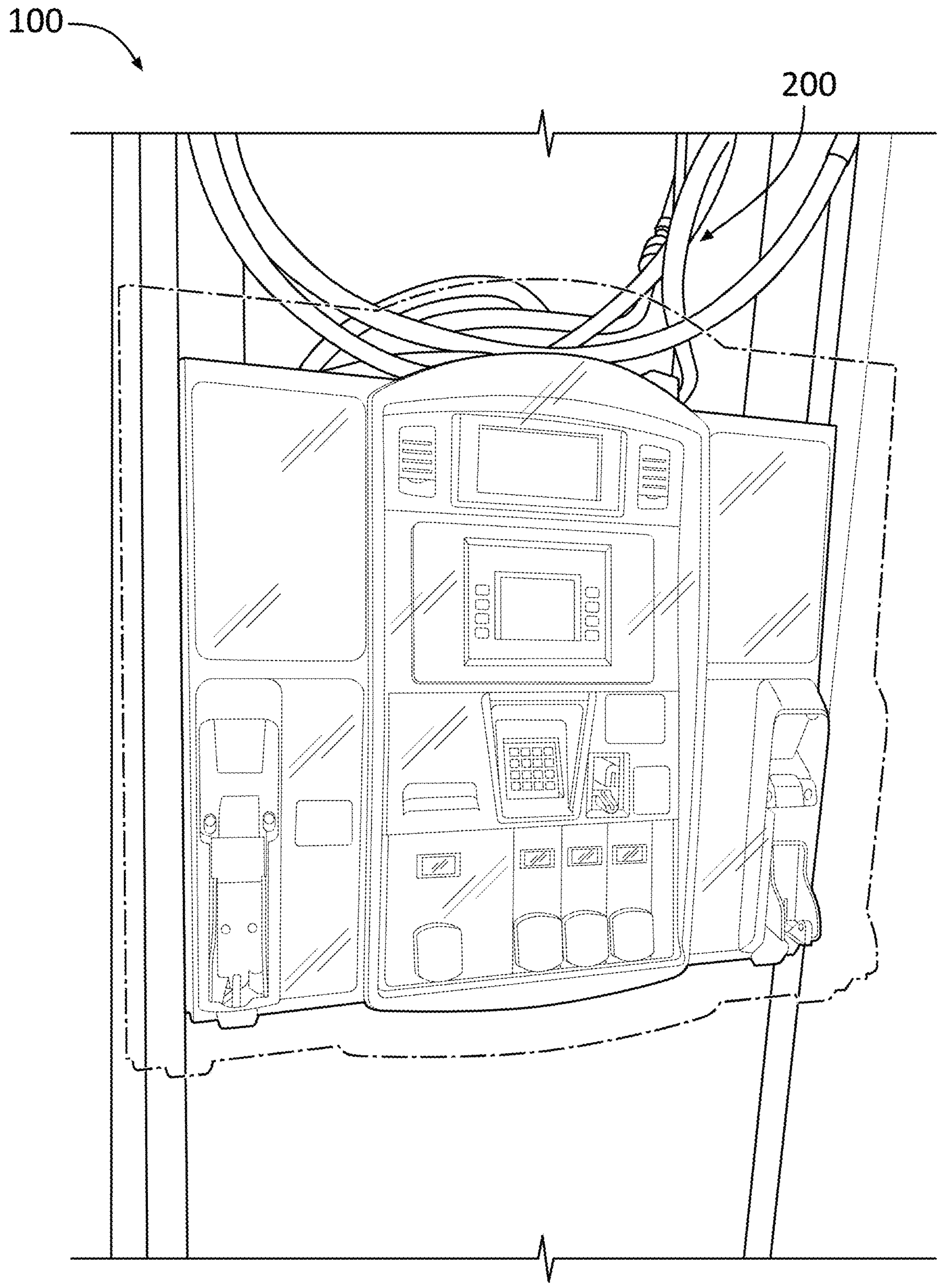
FIG. 2 is a perspective view illustrating one embodiment of a refueling station with a refueling station protective door cover disposed over the refueling station.

FIG. 2 depicts one embodiment of the refueling station 100. The refueling station 100 may include the refueling station 100 of FIG. 1, which may include one or more of the refueling station's 100 components described above in relation to FIG. 1. The refueling station 100 may include a refueling station protective door cover 200 (hereinafter, a "door cover 200"). The door cover 200 may be selectively disposed over at least a portion of the refueling station 100. For example, the door cover 200 may be selectively disposed over the door 110, may be selective disposed over the door 110 and the pump skirt 102, or may be selectively disposed over other portions of the refueling station 100.

In one embodiment, the door cover 200 may include a rigid material. The rigid material may include a plastic, a thermoplastic (for example, a polycarbonate, a polyvinyl chloride (PVC), a polyethylene, a polypropylene, etc.), a metal, or some other type of rigid material. In some embodiments, the door cover 200 may include one or more portions that are transparent or translucent.

In one or more embodiments, the door cover 200 may be disposed on the refueling station 100 via one or more fasteners. The one or more fasteners may fasten the door cover 200 to the refueling station 100. A fastener may include a screw, bolt, buckle, clamp, pin, nail, latch, rivet, anchor, strap, tie, or other type of fastener. In one embodiment, the door cover 200 may snap onto the refueling station 100. For example, the door cover 200 may include one or more flanges that may engage with an outer portion of the refueling station 100, or the refueling station 100 may include one or more flanges that may engage with the door cover 200. In some embodiments, the door cover 200 may be shaped to fit over a certain model or brand of refueling station 100.

In some embodiments, one or more portions of the door cover 200 may be transparent. A portion of the door cover 200 that is transparent may include the portion that is disposed over a graphic portion 112, the first display screen 116, the second display screen 120, or another portion of the refueling station 100. A transparent portion of the door cover 200 may allow a user to view the portions of the refueling station 100 underneath the transparent portion.

In one or more embodiments, one or more portions of the door cover 200 may include an aperture. The aperture may include a hole or cutout from the door cover 200 that may allow a user to access the portion of the refueling station 100 that is underneath the aperture. A portion of the door cover 200 that includes an aperture may include a portion that is disposed over the speaker 118, the second screen 120, the keypad 122, the payment receiver 124, the printer 126, or the grade selection area 128.

In some embodiments, the door cover 200 may protect the refueling station 100 from damage while the refueling station 100 is being transported. For example, the door cover 200 may prevent the refueling station 100 from being scratched, punctured, or otherwise damaged by objects around the refueling station 100 while being shipped or handled. In one embodiment, the door cover 200 may protect the refueling station 100 from damage while located as a gas station or other external location. For example, the door cover 200 may prevent the refueling station 100 from being contacted by a vehicle or may protect the refueling station 100 from vandalism or theft. A transparent portion of the door cover 200 may allow a user to still view portions of the refueling station 100 while the door cover 200 is disposed on the refueling station 100. An aperture of the door cover 200 may allow a user to still access portions of the refueling station 100 while the door cover 200 is disposed on the refueling station 100. The door cover 200 may protect against the weather or may add an extra layer of security to the refueling station 100.

Figure 3:
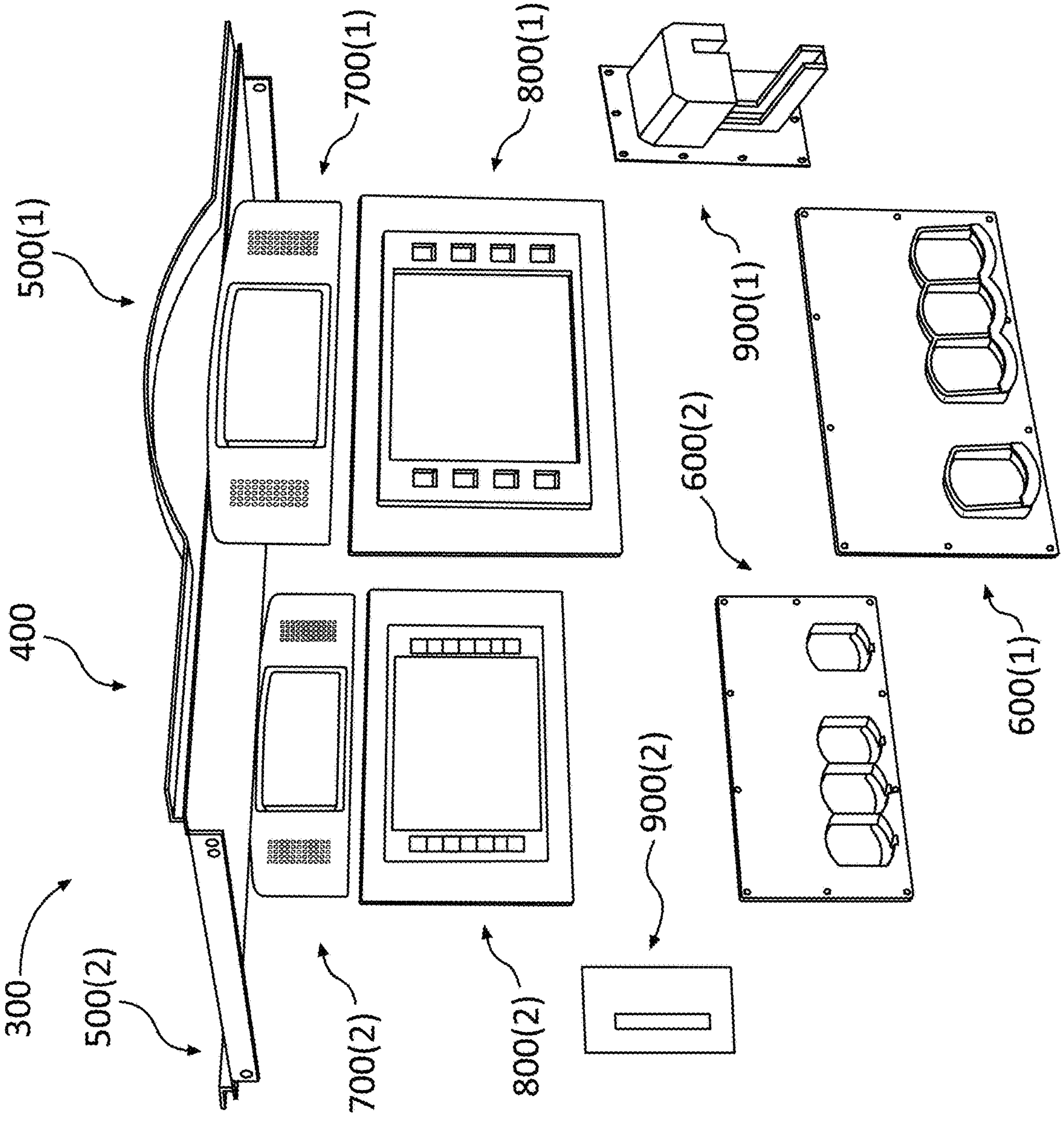
FIG. 3 is a perspective view illustrating one embodiment of a system for a refueling station protective door cover.

FIG. 3 depicts one embodiment of a system 300. The system 300 may include a system for a refueling station protective door cover. The system 300 may include a station top cover 400. The system 300 may include one or more top door shields 500(1)-(2). The system 300 may include one or more button covers 600(1)-(2). The system 300 may include one or more upper display covers 700(1)-(2). The system 300 may include one or more selection display covers 800(1)-(2). The system 300 may include one or more payment receiver covers 900(1)-(2). The door cover 200 may include one or more components of the system 300, such as the station top cover 400, the top door shield 500, the button cover 600, the upper display cover 700, the selection display cover 800, or the payment receiver cover 900.

In one embodiment, the system 300 may be disposed on a refueling station, such as the refueling station 100 of FIG. 1 or FIG. 2. In some embodiments, a refueling station 100 may include components 102-128 on multiple sides of the refueling station 100. For example, the refueling station may include components 102-128 disposed on opposite sides from each other. The system 300 may be disposed on both sides of the refueling station 100, as is seen in FIG. 3. In some embodiments, a refueling station 100 may include components 102-128 on a single side of the refueling station 100, hence, the system 300 may not include the second top door shield 500(2), button cover 600(2), upper display cover 700(2), or selection display cover 800(2).

FIGS. 4A-4D depict embodiments of a station top cover 400. As can be seen from the figures, the station top cover 400 may include a cover surface 402. The cover surface 402 may include a substantially flat surface that covers the top surface of the refueling station 100. The station top cover 400 may include one or more apertures 404. An aperture 404 may include a hole that may allow material to pass through it from one side of the station top cover 400 to the other. An aperture 404 may include an aperture for a bolt, screw, or other fastener to at least partially pass through. The fastener may mount the station top cover 400 to the refueling station 100. One or more apertures 404 may be disposed in a central portion of the cover surface 402, a perimeter portion of the cover surface 402, or in other locations on the station top cover 400, as in shown in FIGS. 4A-D.

Figure 4A:
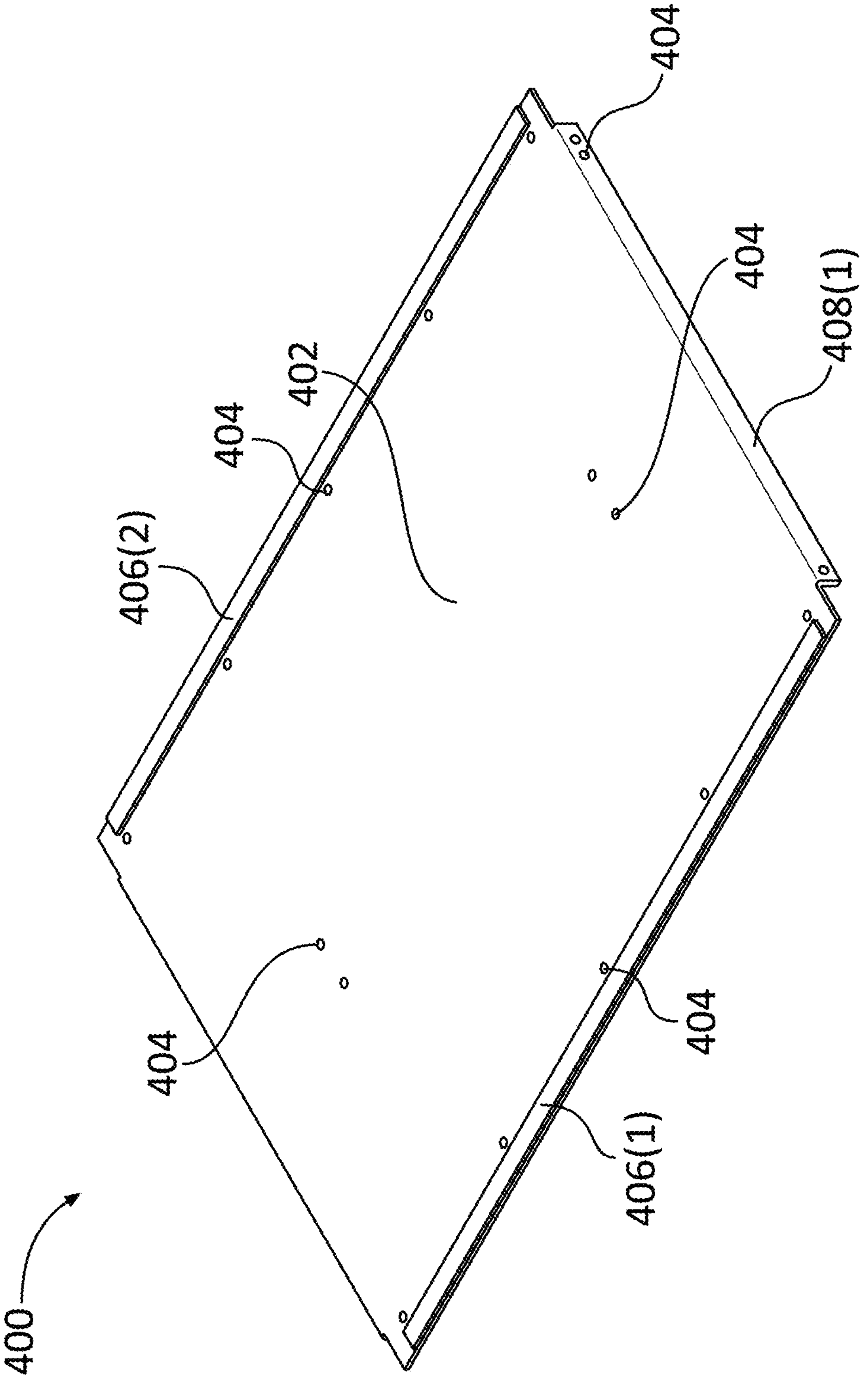
FIG. 4A is a perspective view illustrating one embodiment of a station top cover of a system for a refueling station protective door cover.
Figure 4B:
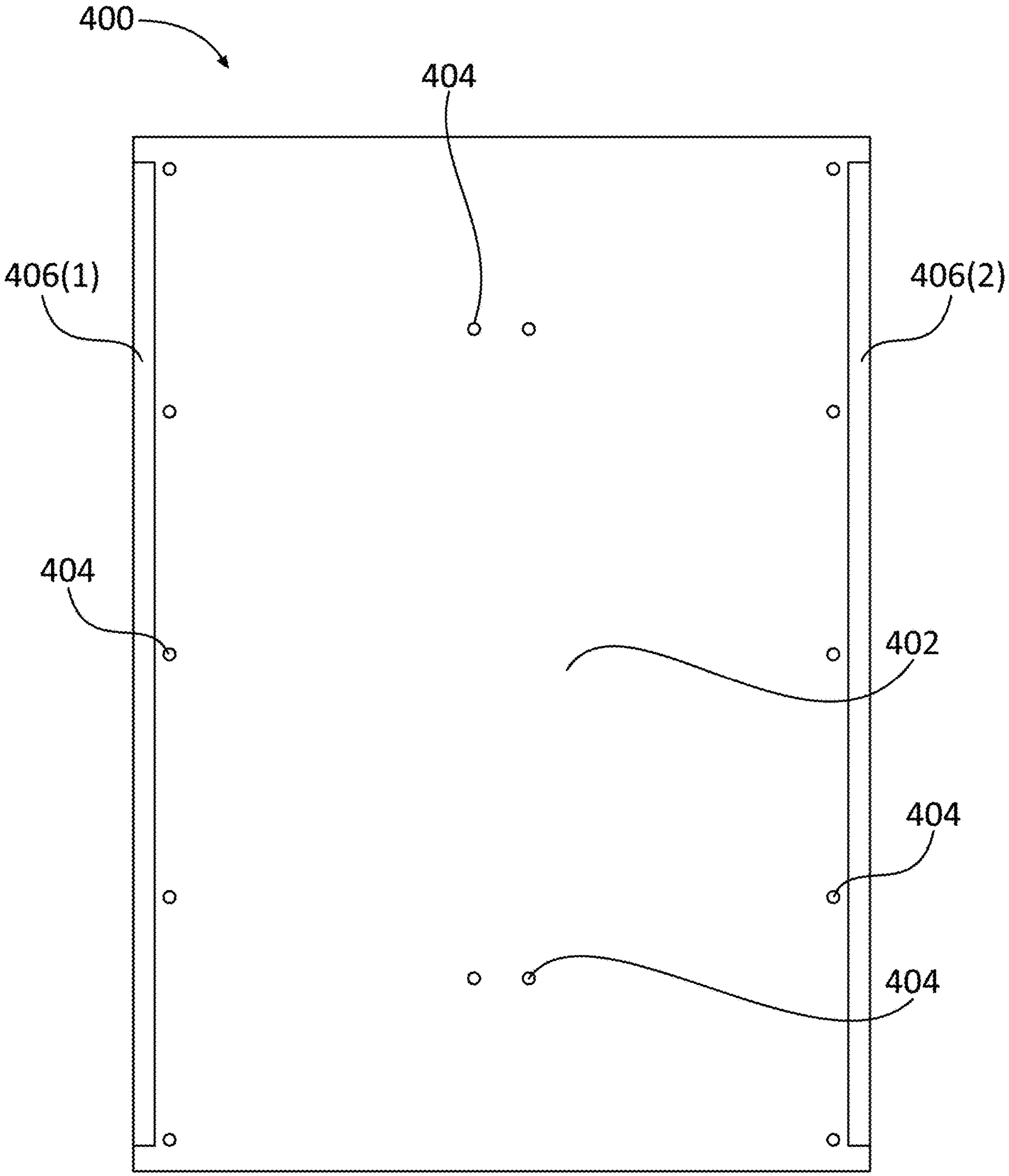
FIG. 4B is a top-down view illustrating one embodiment of a station top cover of a system for a refueling station protective door cover.
Figure 4C:
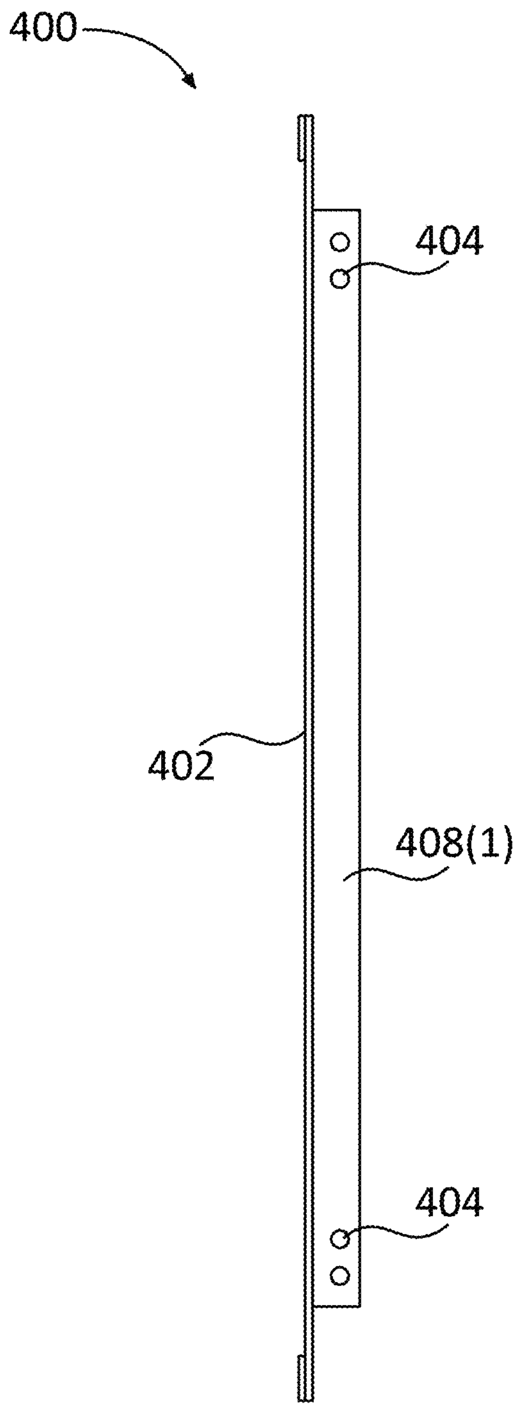
FIG. 4C is a side view illustrating one embodiment of a station top cover of a system for a refueling station protective door cover.
Figure 4D:
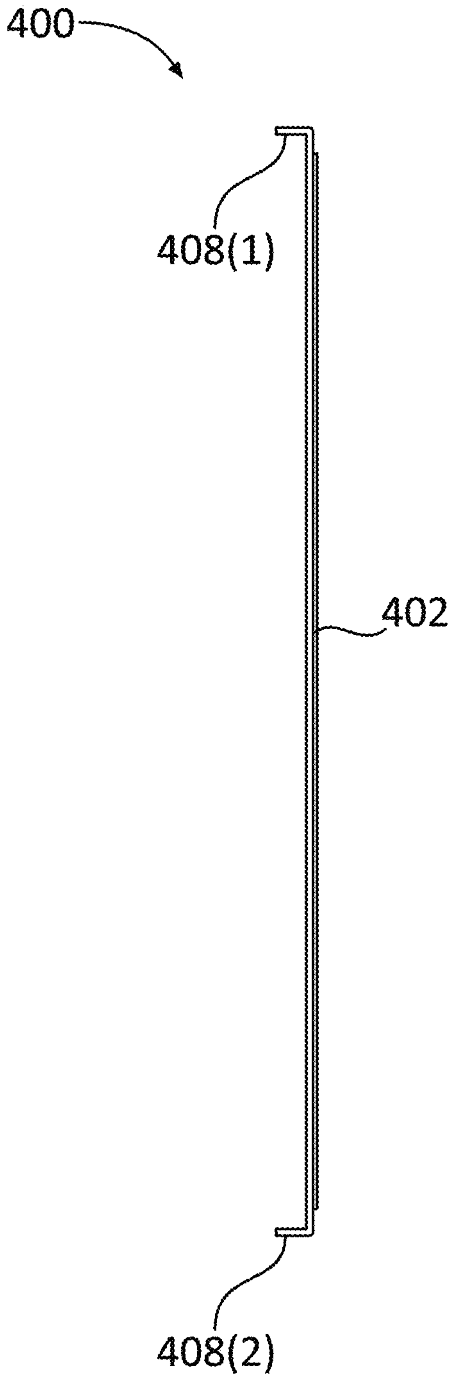
FIG. 4D is a side view illustrating one embodiment of a station top cover of a system for a refueling station protective door cover.

In one embodiment, the station top cover 400 may include one or more mounting surfaces 406(1)-(2). A mounting surface 406 may be disposed on a perimeter portion of the cover surface 402. The mounting surface 406 may be configured to receive a top door shield 500. In some embodiments, as is shown in FIG. 4A and FIG. 4B, two mounting surfaces 406(1)-(2) may be disposed on opposite sides of the cover surface 402. A mounting surface 406 may include an indentation in the cover surface 402.

In one embodiment, the station top cover 400 may include one or more overhangs 408(1)-(2). An overhang 408 may include a portion of the station top cover 400 that hangs down below the cover surface 402. The overhang 408 may include one or more apertures 404. An overhang may allow the station top cover 400 to be secured to a side portion of the refueling station 100.

FIGS. 5A-5D depict embodiments of a top door shield 500. A top door shield 500 may include a first shield portion 502(1) and a second shield portion 502(2). The top door shield 500 may include a raised shield 504. The top door shield 504 may include a mounting portion 506. The top door shield 500 may include one or more apertures 508. The top door shield 500 may include a raised shield panel 510. The top door shield 500 may be disposed on a top portion of the refueling station 100 in order to provide protection.

In one embodiment, the first or second shield portion 502(1)-(2) may include a substantially flat surface. The raised shield 504 may include a curved portion that rises above the first or second shield portions 502(1)-(2). In one embodiment, the raised shield 504 may be disposed between the first and second shield portions 502(1)-(2). The mounting portion 506 may be disposed to the side of the first shield portion 502(1), the second shield portion 502(2), or the raised shield 504.

In some embodiments, the length of the top door shield 500 (i.e., the distance from the left to the right in FIG. 5B) may include a length of approx. 36 inches (approx. 91.44 cm). The width of the top door shield 500 (i.e., the distance from the top to the bottom in FIG. 5B) may include a width of approx. 3 inches (approx. 7.62 cm). The height of the top door shield 500 (i.e., the distance from the top to the bottom in FIG. 5C) may include a height of approx. 2.5 inches (approx. 6.35 cm). In some embodiments, the first or second shield portion 502(1) or (2) may include a length of approx. 9.9 inches (approx. 25.15. The raised shield 504 may include a length of approx. 16.2 inches (approx. 41.15 cm). The height of the first or second shield portion 502(1) or (2) may include a height of approx. 0.56 inches (approx. 1.42 cm). In some embodiments, the above-mentioned components of the top door shield 500 may include dimensions that are smaller or larger than those disclosed above.

Figure 5A:
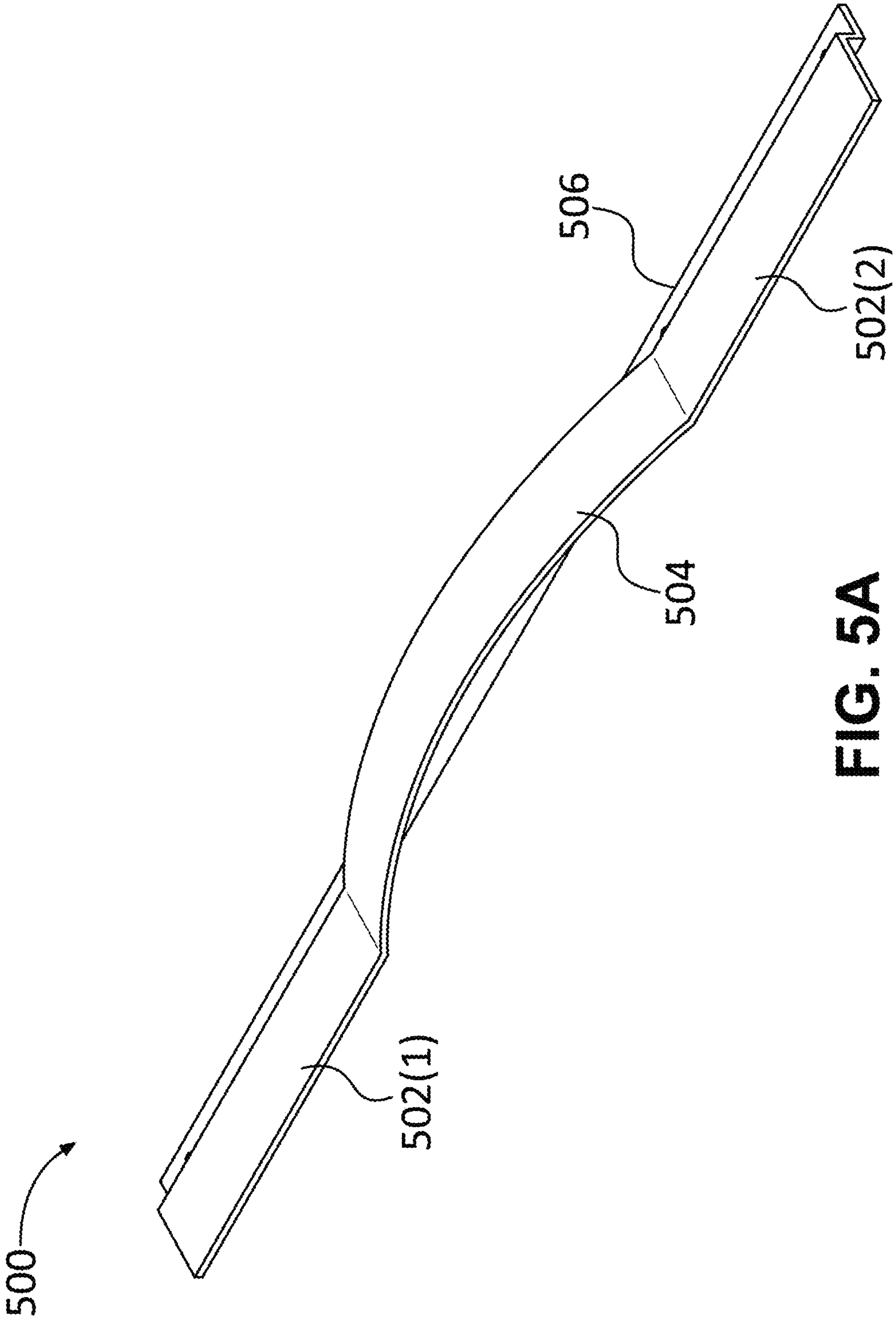
FIG. 5A is a perspective view illustrating one embodiment of a top door shield of a system for a refueling station protective door cover.
Figure 5B:
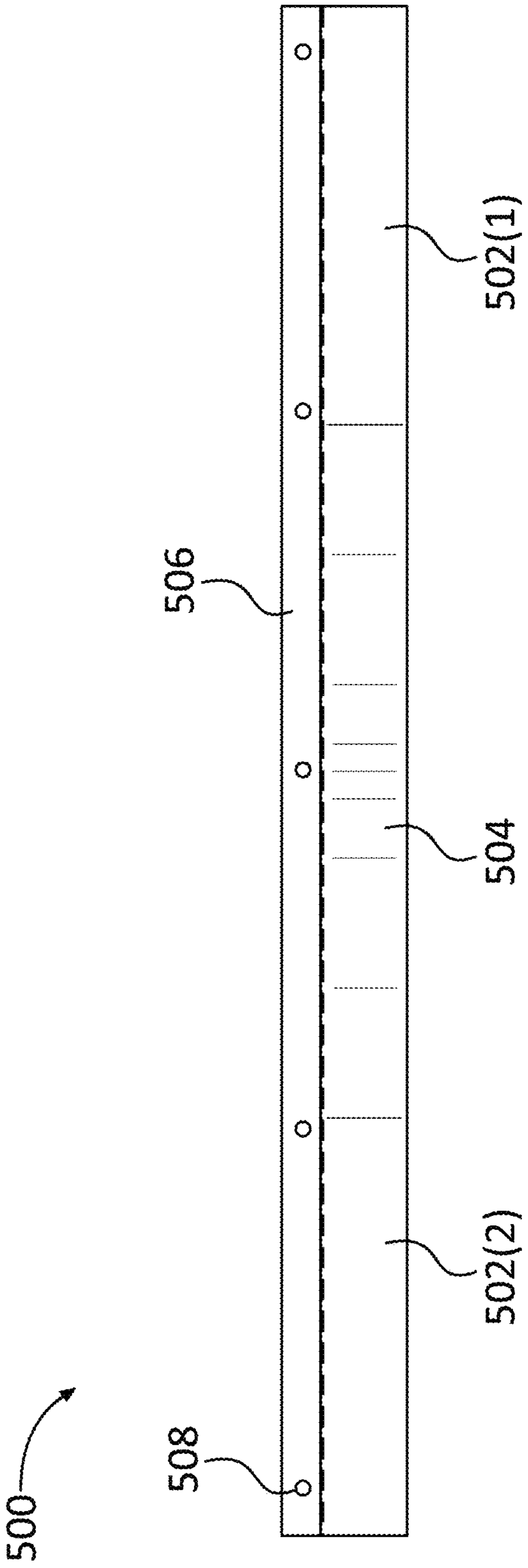
FIG. 5B is a top-down view illustrating one embodiment of a top door shield of a system for a refueling station protective door cover.
Figure 5C:
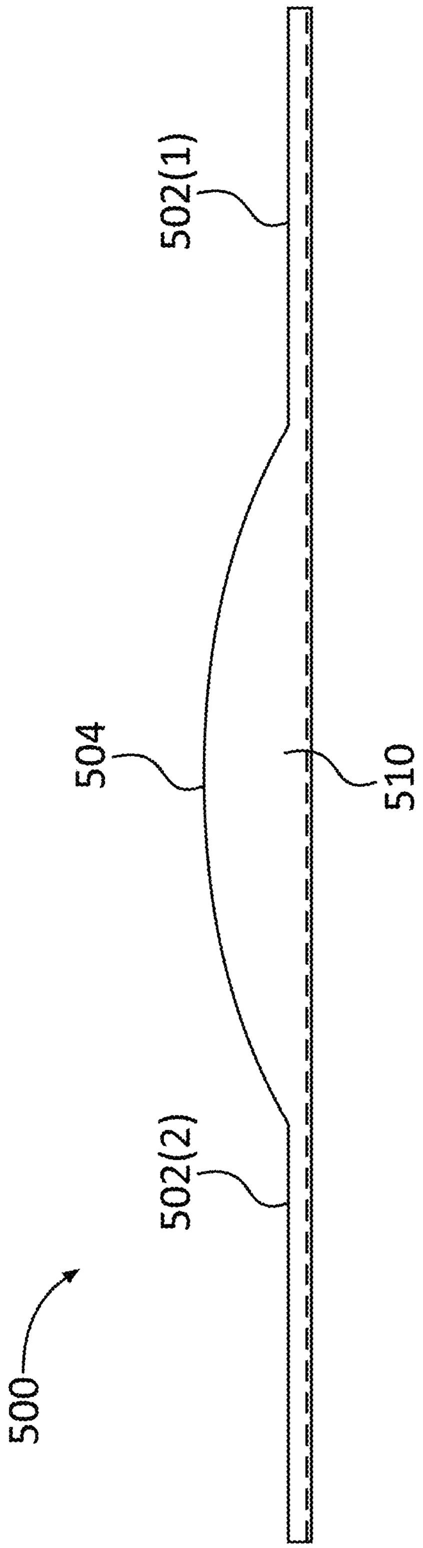
FIG. 5C is a front view illustrating one embodiment of a top door shield of a system for a refueling station protective door cover.

In one embodiment, the raised shield panel 510 may be disposed underneath the raised shield 504. The raised shield panel 510 may include a substantially flat surface disposed under the raised shield 504. As shown in FIG. 5B, the mounting portion 506 may include one or more apertures 508. One or more of the one or more apertures 508 may align with one or more apertures 404 of the top cover 400 in order to insert a fastener into both the aperture 404 of the top cover 400 and the aperture 508 of the top door shield 500 and, thus, fasten the top door shield 500 to the top cover 400.

Figure 5D:
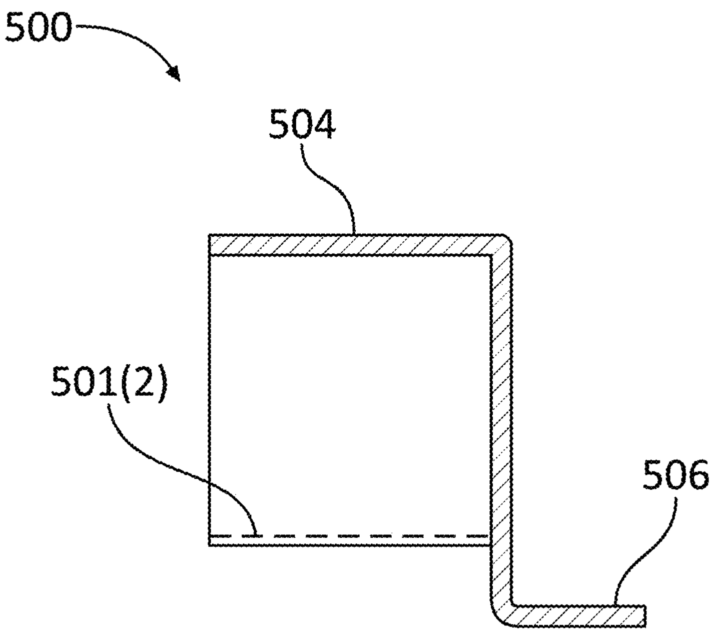
FIG. 5D is a side view illustrating one embodiment of a top door shield of a system for a refueling station protective door cover.

As shown in FIG. 5D, in some embodiments, the mounting portion 506 may be disposed at a lower height than the first or second shield portions 502(1)-(2) or the raised shield 504.

FIGS. 6A-6D depict embodiments of a button cover 600. The button cover may include a cover surface 602. The button cover 600 may include one or more apertures 604. The button cover 600 may include one or more button protectors 606(1)-(4) disposed on the cover surface 602. In some embodiments, an aperture 604 may include a hole that can receive a fastener so that the button cover 600 may be secured to the refueling station 100. The button cover 600 may be disposed at least partially over the grade selection area 128 of the refueling station 100. The button cover 600 may protect the grade selection area 128 while still allowing a user to access the grade selection buttons of the refueling station 100.

Figure 6A:
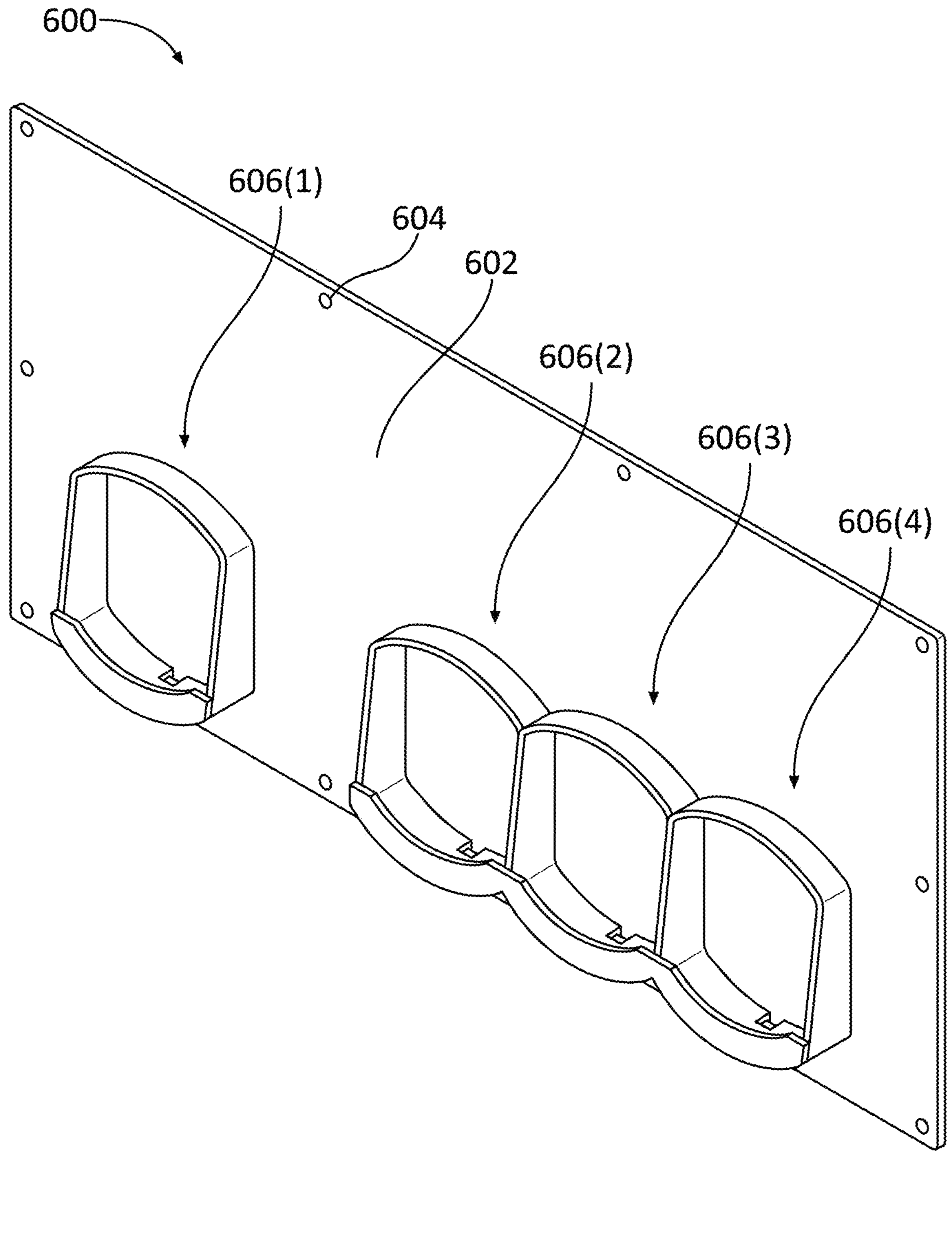
FIG. 6A is a perspective view illustrating one embodiment of a button cover of a system for a refueling station protective door cover.

In some embodiments, a button protector 606 may be disposed on the surface cover 602 with no other button protectors 606 disposed directly next to it (e.g., button protector 606(1) in FIG. 6A). In one embodiment, multiple button protectors 606 may be disposed directly next to each other (e.g., button protectors 606(2)-(4). The button protectors 606(1)-(*n*) positions may align with the buttons of the grade selection area 128.

Figure 6B:
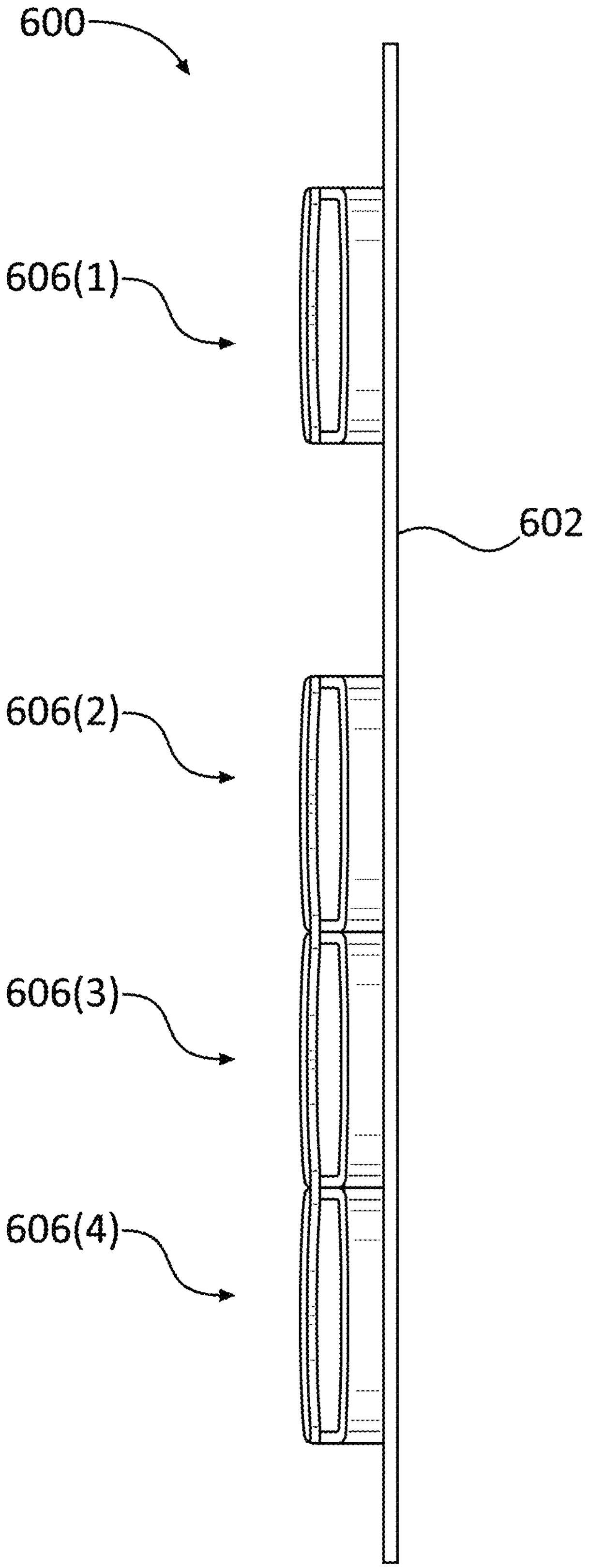
FIG. 6B is a top-down view illustrating one embodiment of a button cover of a system for a refueling station protective door cover.
Figure 6C:
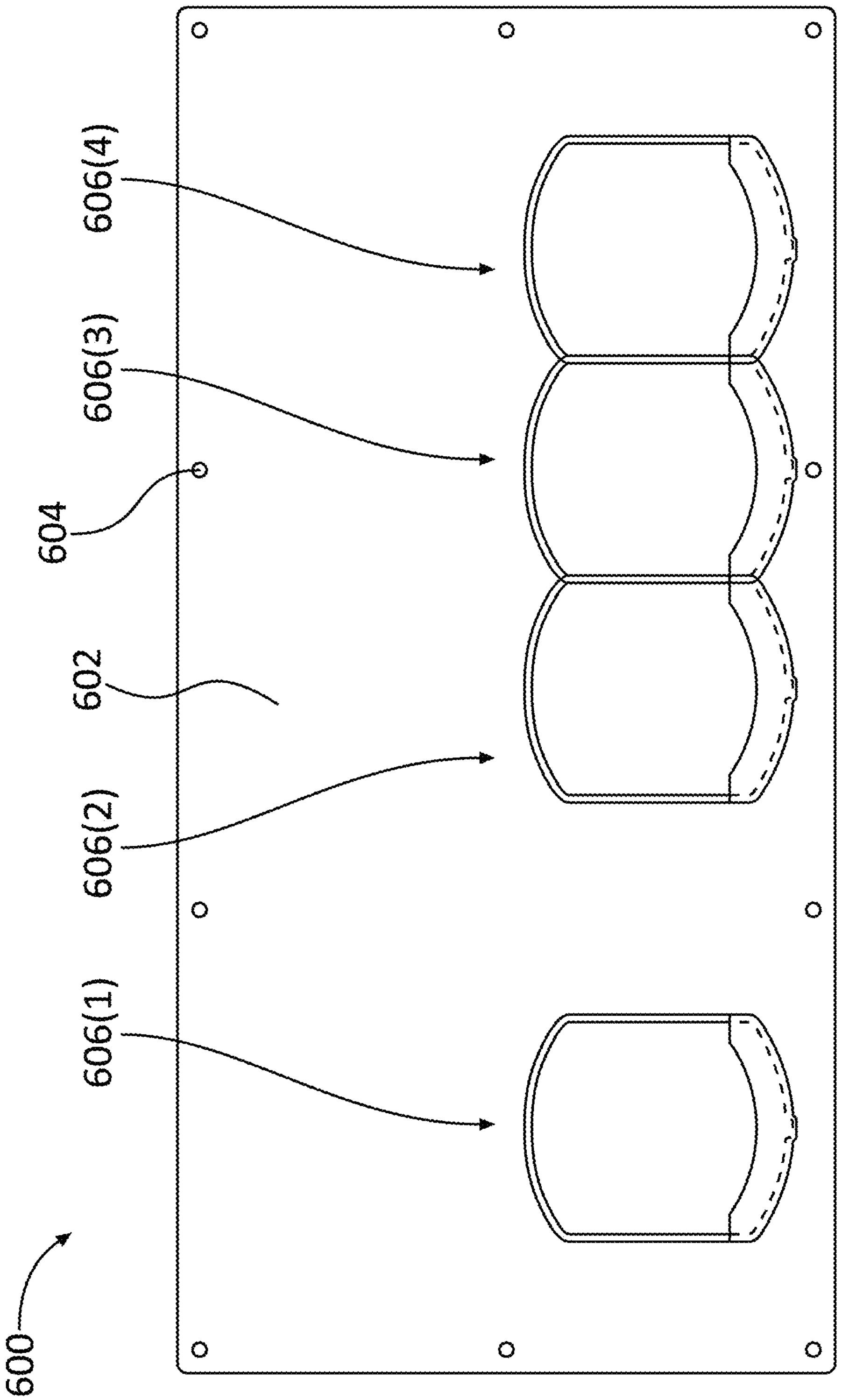
FIG. 6C is a front view illustrating one embodiment of a button cover of a system for a refueling station protective door cover.
Figure 6D:
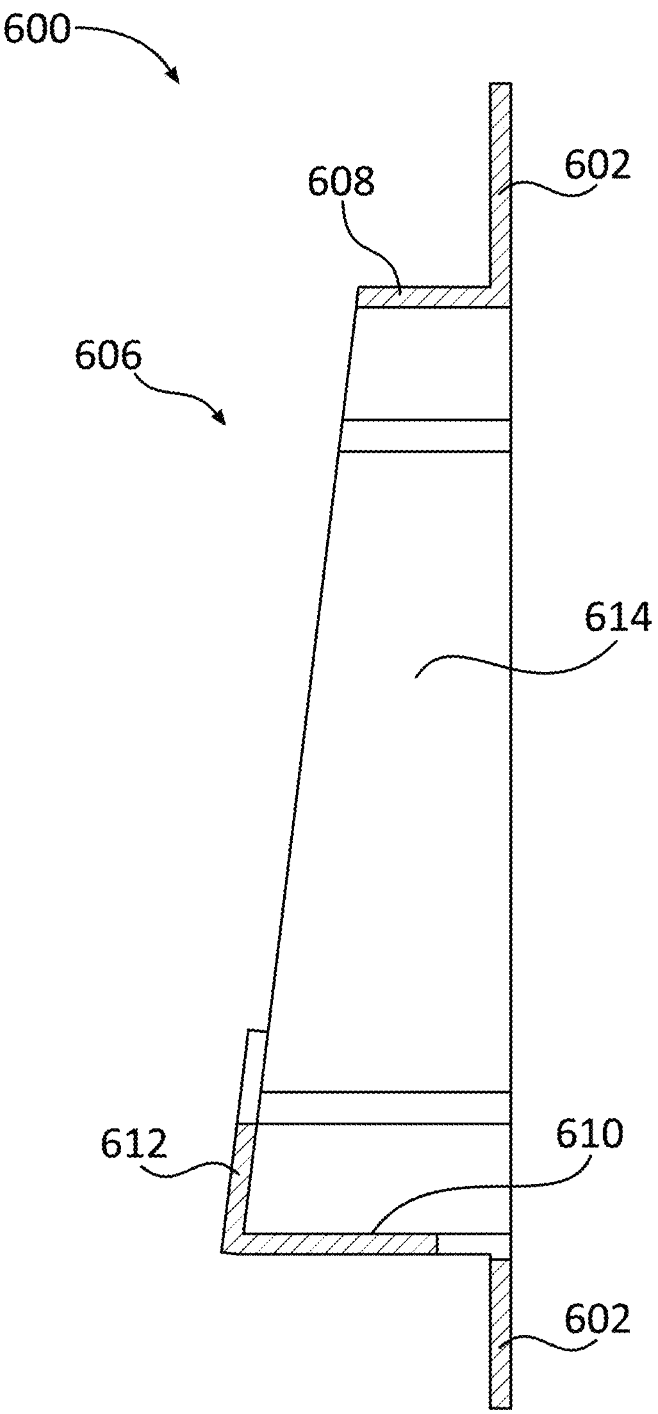
FIG. 6D is a cutaway side view illustrating one embodiment of a button protector of a button cover of a system for a refueling station protective door cover.

FIG. 6D depicts one embodiment of a button protector 606. In some embodiments, the button protector 606 may be integral with the cover surface 602, or the button cover 606 may be separately formed and attached to the cover surface 602. The button protector 606 may include a structure that surrounds an aperture in the cover surface 602. The aperture in the cover surface 602 may allow a user to access a grade selection button of the grade selection area 128 while the structure of the button protector 606 protects the grade selection button.

In some embodiments, the button protector 606 may include a top ledge 608. The top ledge 608 may include a protrusion extending away from the cover surface 602. The top ledge 608 may be disposed above the aperture in the cover surface 602 that allows access to a grade selection button. The top ledge 608 may be substantially flat or may be curved (as is shown in FIG. 6A). A peak of the curve may be disposed away from the aperture in the cover surface 602 that allows access to a grade selection button.

In one embodiment, the button protector 606 may include a bottom ledge 610. The bottom ledge 610 may include a protrusion extending away from the cover surface 602. The bottom ledge 610 may be disposed below the aperture in the cover surface 602 that allows access to a grade selection button. In some embodiments, the bottom ledge 610 may extend away from the surface cover 602 further than the top ledge 608 (as is shown in FIG. 6D). The bottom ledge 610 may be substantially flat or may be curved (as is shown in FIG. 6A). A peak of the curve may be disposed away from the aperture in the cover surface 602 that allows access to a grade selection button.

In some embodiments, the bottom ledge 610 may include a lip 612. The lip 612 may extend upward from the bottom ledge 610. The button protector 606 may include a side edge 614. The side edge 614 may include a protrusion extending away from the cover surface 602. The side edge 614 may be disposed to a side of the aperture in the cover surface 602 that allows access to a grade selection button. As is shown in FIGS. 6A-6C, in some embodiments, multiple button protectors 606 may share a side edge 614. For example, in FIG. 6A, the button protector 606(2)'s right side edge 614 includes the button protector 606(3)'s left side edge 614.

The button cover 600 may include one or more button protectors 606(1)-(*n*). The number of button protectors 606 may include one, two, three, four, five, six, seven, eight, nine, or ten or more button protectors 606.

Figure 7A:
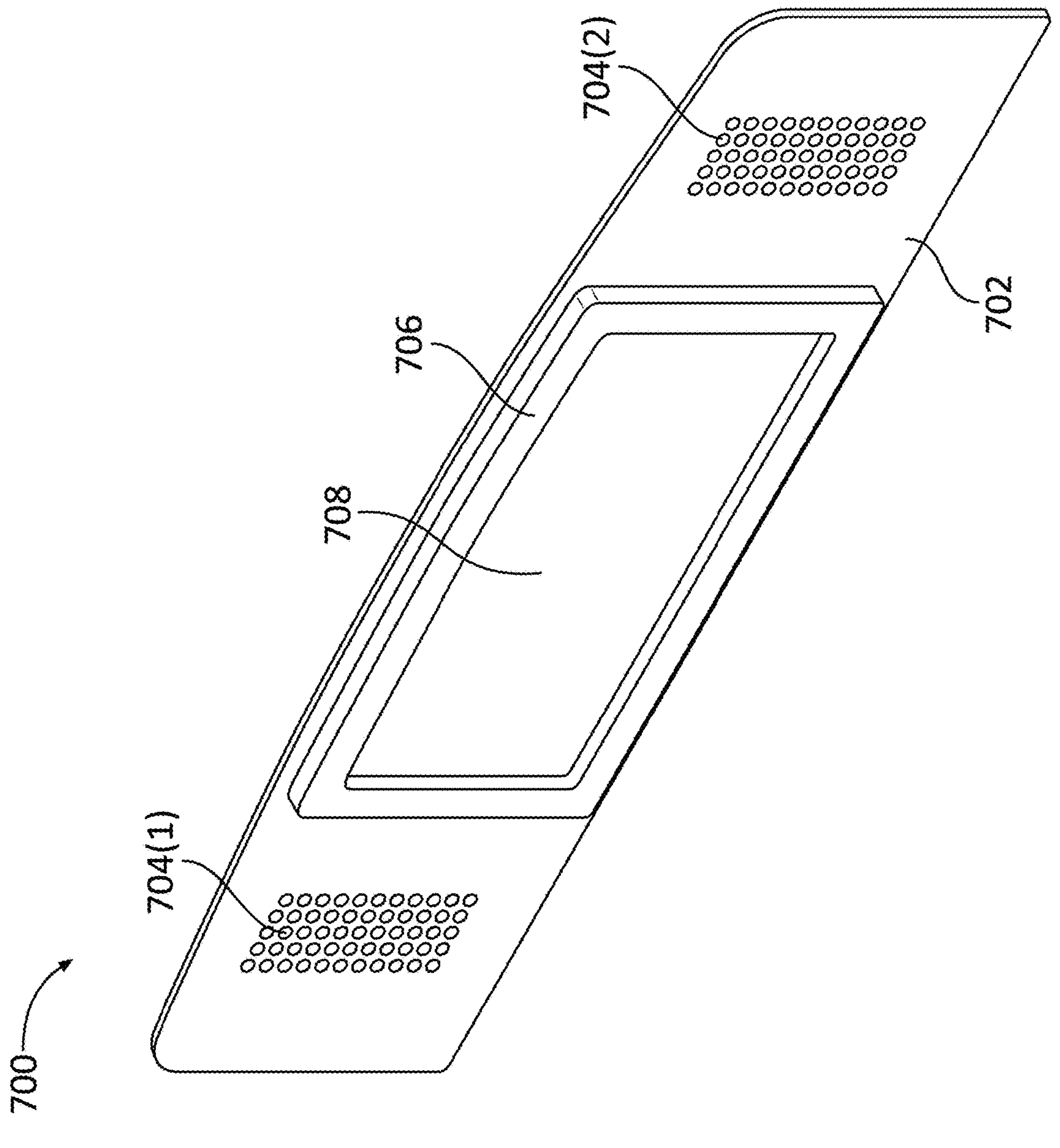
FIG. 7A is a perspective view illustrating one embodiment of an upper display cover of a system for a refueling station protective door cover.
Figure 7B:
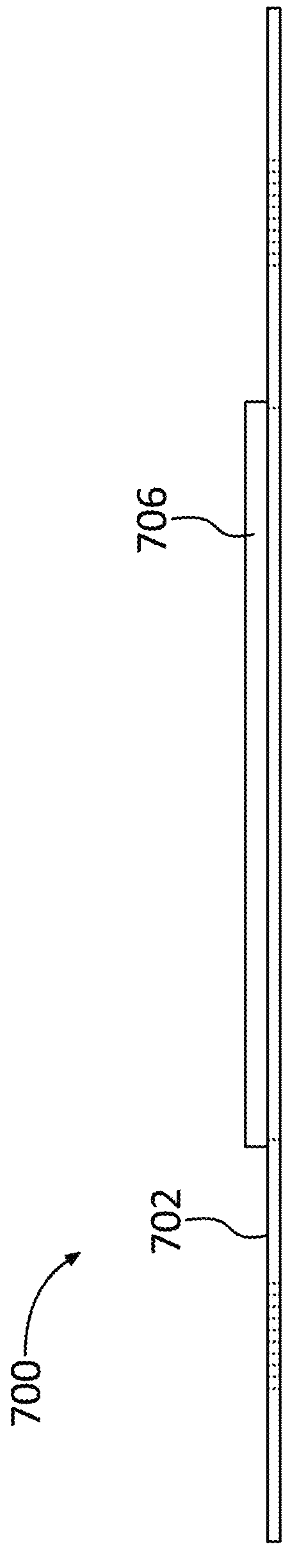
FIG. 7B is a top-down view illustrating one embodiment of an upper display cover of a system for a refueling station protective door cover.
Figure 7C:
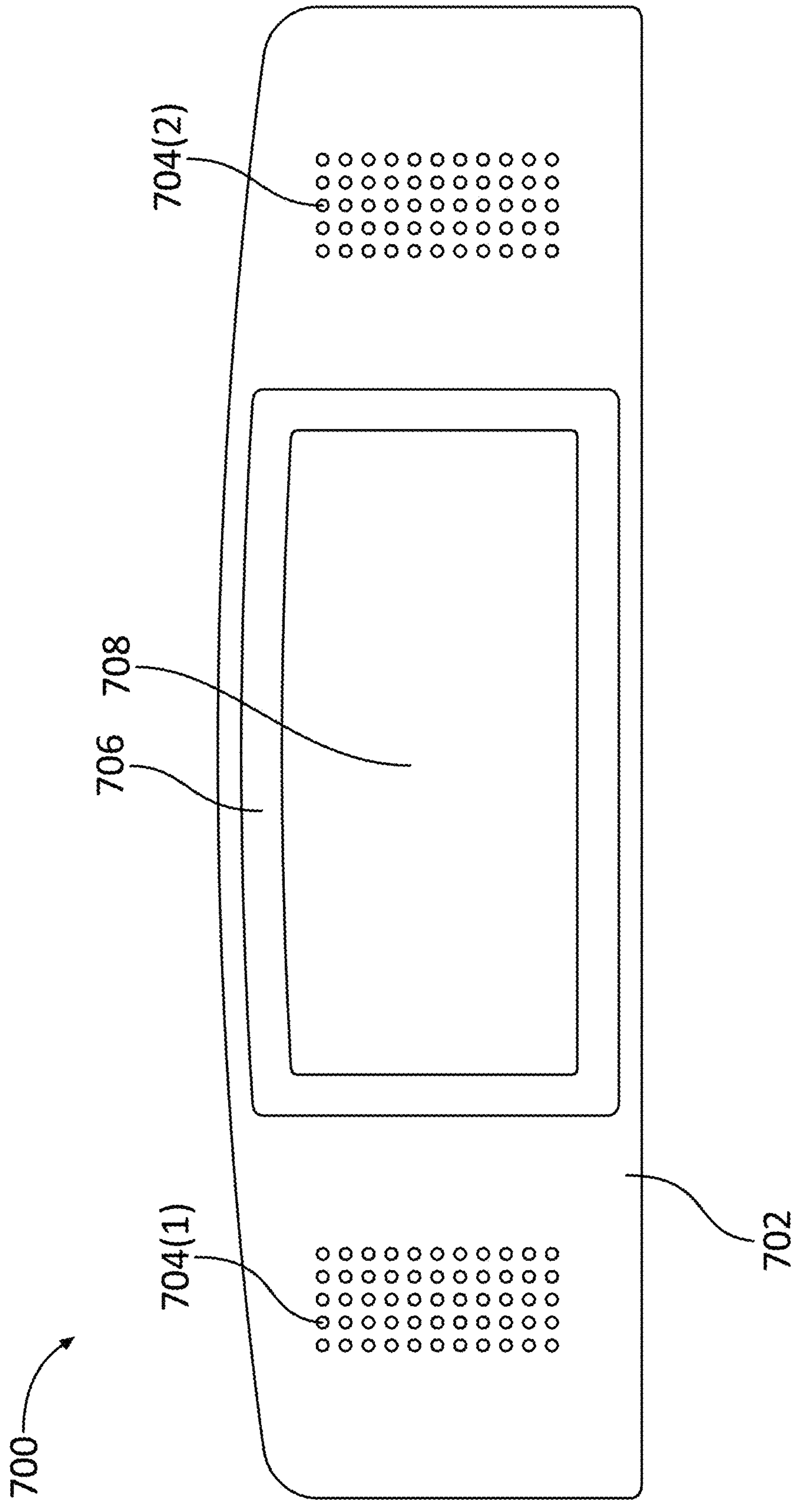
FIG. 7C is a front view illustrating one embodiment of an upper display cover of a system for a refueling station protective door cover.
Figure 7D:
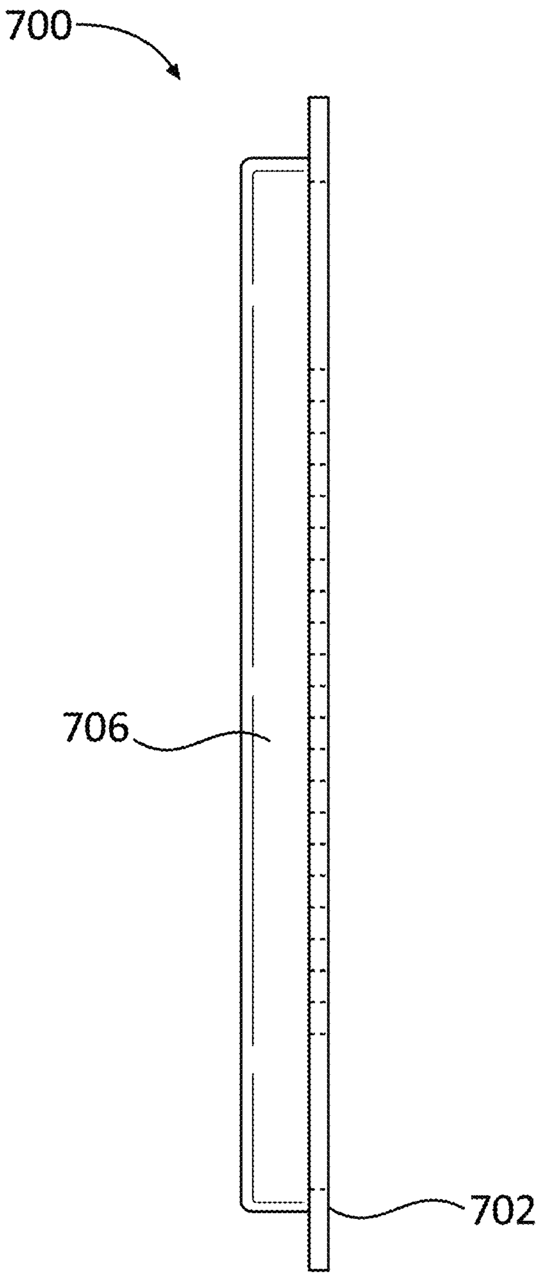
FIG. 7D is a side view illustrating one embodiment of an upper display cover of a system for a refueling station protective door cover.

FIGS. 7A-7B depict embodiments of an upper display cover 700. The upper display cover may include a cover surface 702. The upper display cover 700 may include one or more speaker aperture areas 704(1)-(2). The upper display cover 700 may include a bezel 706. The upper display cover 700 may include a display protector 708. The upper display cover 700 may be disposable over a first display screen 116 or a speaker 118 of a refueling station 100 in order to protect such components of the refueling station 100.

In some embodiments, the surface cover 702 may include a substantially flat surface. A speaker aperture area 704 may include one or more apertures in the surface cover 702. These apertures may be sized and shaped to allow sound from the speaker 118 to be heard by a user and still protect the speaker 118 and the refueling station 110. The apertures may be disposed in a grid pattern (as is shown in FIG. 7A), a circular pattern, or in some other configuration.

In one embodiment, the bezel 706 may include a surface that protrudes away from the surface cover 702. The bezel 706 may be disposed around a perimeter of the display protector 708. The display protector 708 may include a substantially transparent material that may allow the user to see the first display screen 116 of the refueling station 100 while still protecting the display and the refueling station 100. In some embodiments, the display protector 708 may include a material that can transfer electrical signals or pressure to the first display screen 116 such that the user can still use the first display screen 116 as a touch screen even when the display protector 708 is disposed over the first display screen 116. In some embodiments, the upper display cover 700 may not include a display protector 708 and may, instead, include an aperture in the surface cover 702 that allows the user to access the first display screen 116 directly.

In some embodiments, the upper display cover 700 may include one or more apertures that may allow the upper display cover 700 to be mounted to the refueling station 100. These one or more apertures may be similar to the apertures 404 of FIGS. 4A-4D, the apertures 508 of FIGS. 5A-5D, or the apertures 604 of FIGS. 6A-6D.

Figure 8A:
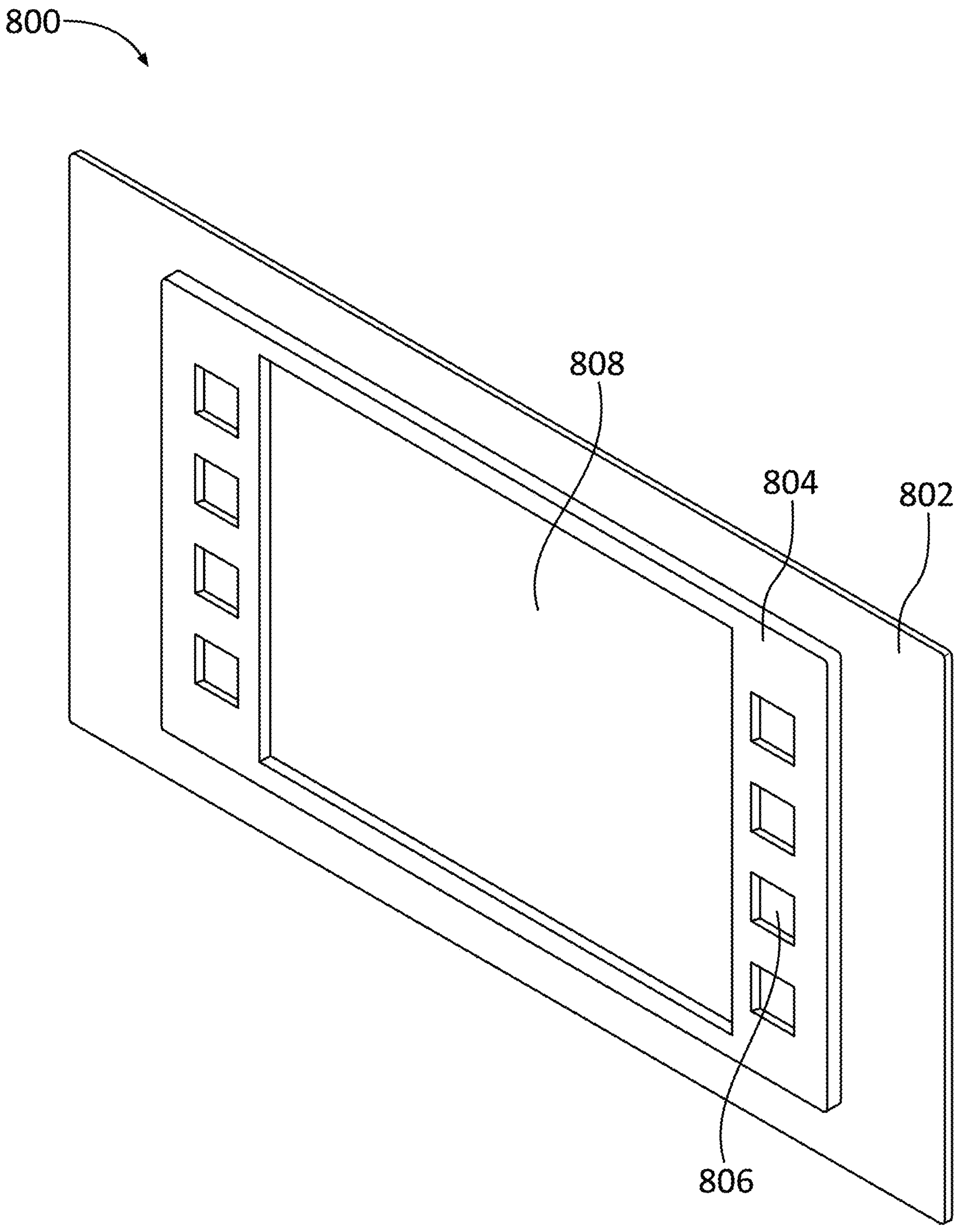
FIG. 8A is a perspective view illustrating one embodiment of a selection display cover of a system for a refueling station protective door cover.
Figure 8B:
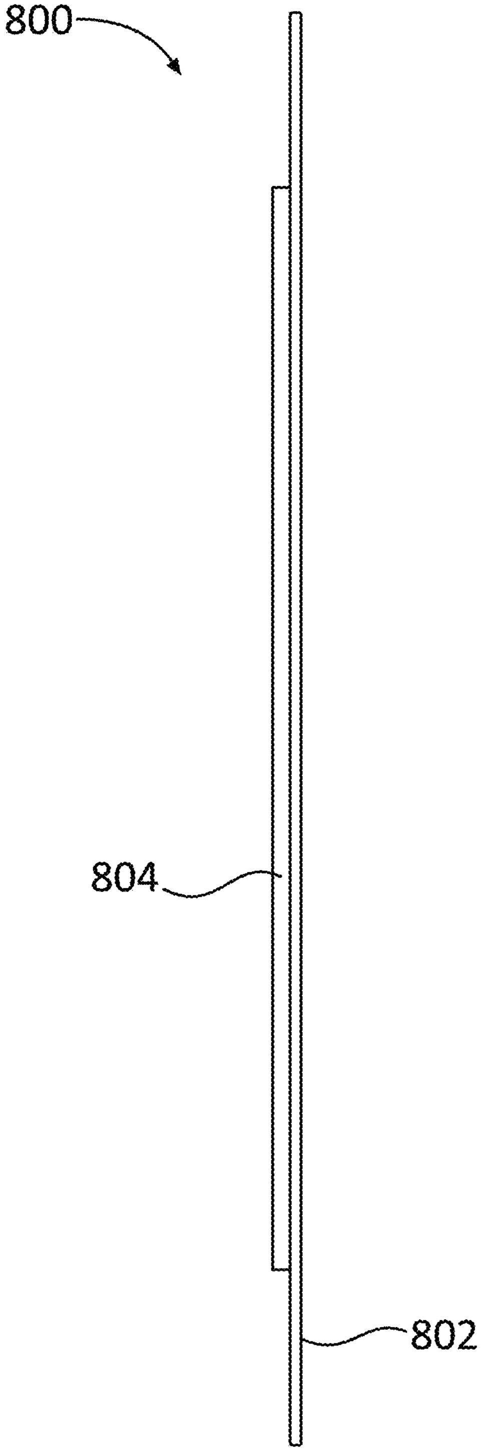
FIG. 8B is a top-down view illustrating one embodiment of a selection display cover of a system for a refueling station protective door cover.
Figure 8C:
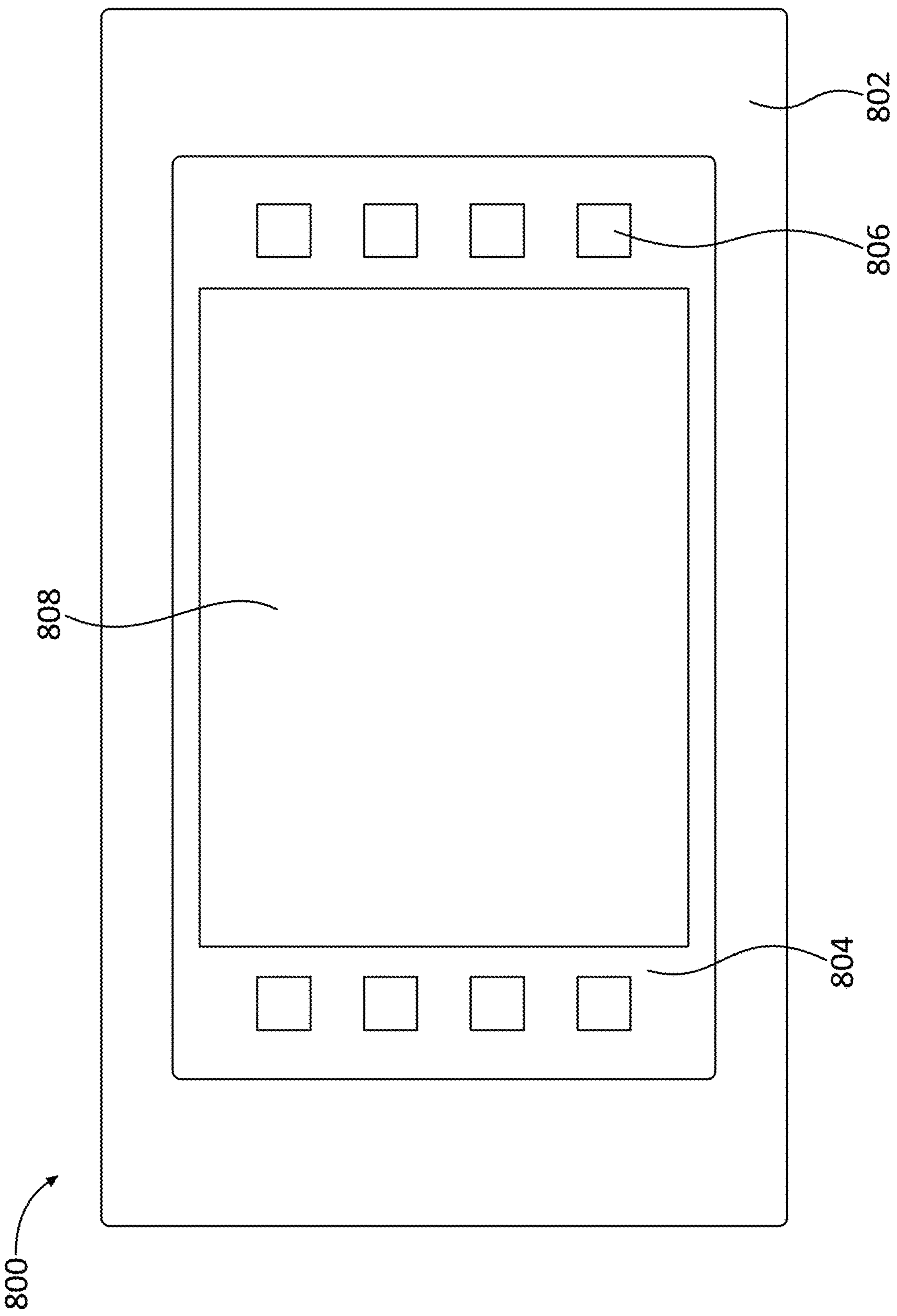
FIG. 8C is a front view illustrating one embodiment of a selection display cover of a system for a refueling station protective door cover.
Figure 8D:
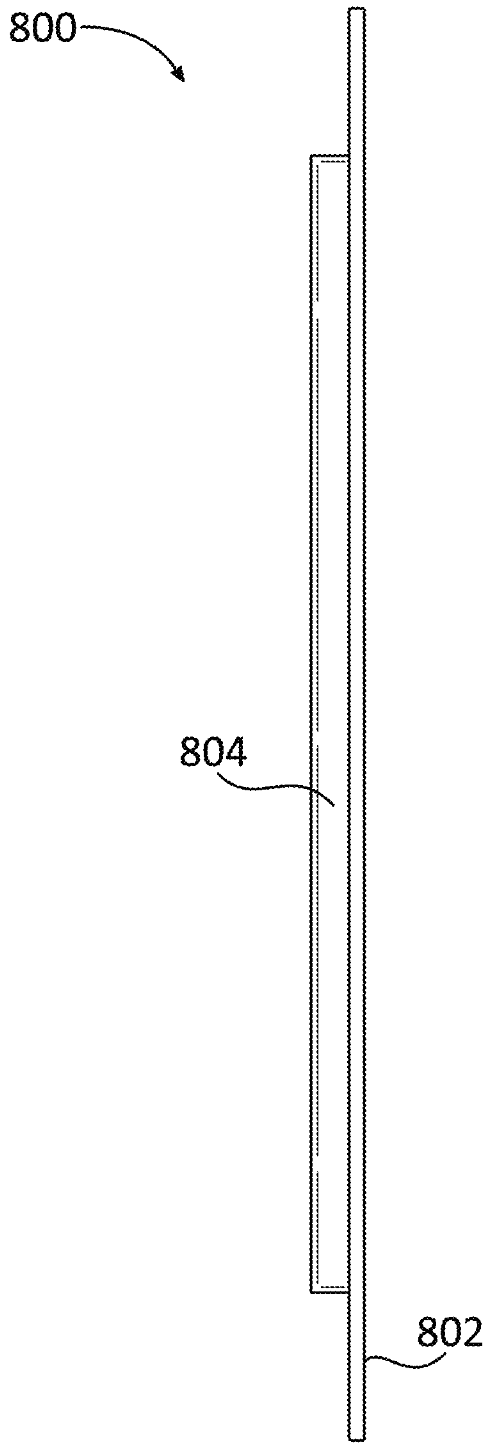
FIG. 8D is a side view illustrating one embodiment of a selection display cover of a system for a refueling station protective door cover.

FIGS. 8A-8B depict embodiments of a selection display cover 800. The selection display cover 800 may include a surface cover 802. The selection display cover 800 may include a bezel 804. The selection display cover 800 may include one or more button covers 806. The selection display cover may include a display protector 808. The selection display cover 800 may be disposable over a second display screen 120 of a refueling station 100.

In some embodiments, the surface cover 802 may include a substantially flat surface. The bezel 804 may include a surface that protrudes away from the surface cover 802. The bezel 804 may be disposed around a perimeter of the display protector 808. In some embodiments, one or more button covers 806 may be disposed in the bezel 804. In one embodiment, a button cover 806 may include an aperture in the bezel 804 such that the user can directly access a button near the second display screen 120. In other embodiments, a button cover may include a material that covers the button near the second display screen 120 but still allows the user to press the button. The material of the button cover 804 may include a malleable plastic or other semi-rigid material.

In one or more embodiments, the display protector 808 may include a substantially transparent material that may allow the user to see the second display screen 120 of the refueling station 100 while still protecting the display and the refueling station 100. In some embodiments, the display protector 808 may include a material that can transfer electrical signals or pressure to the second display screen 120 such that the user can still use the second display screen 120 as a touch screen even when the display protector 808 is disposed over the second display screen 120. In some embodiments, the selection display cover 800 may not include a display protector 808 and may, instead, include an aperture in the surface cover 802 that allows the user to access the second display screen 120 directly.

In some embodiments, the selection display cover 800 may include one or more apertures that may allow the selection display cover 800 to be mounted to the refueling station 100. These one or more apertures may be similar to the apertures 404 of FIGS. 4A-4D, the apertures 508 of FIGS. 5A-5D, or the apertures 604 of FIGS. 6A-6D.

Figure 9A:
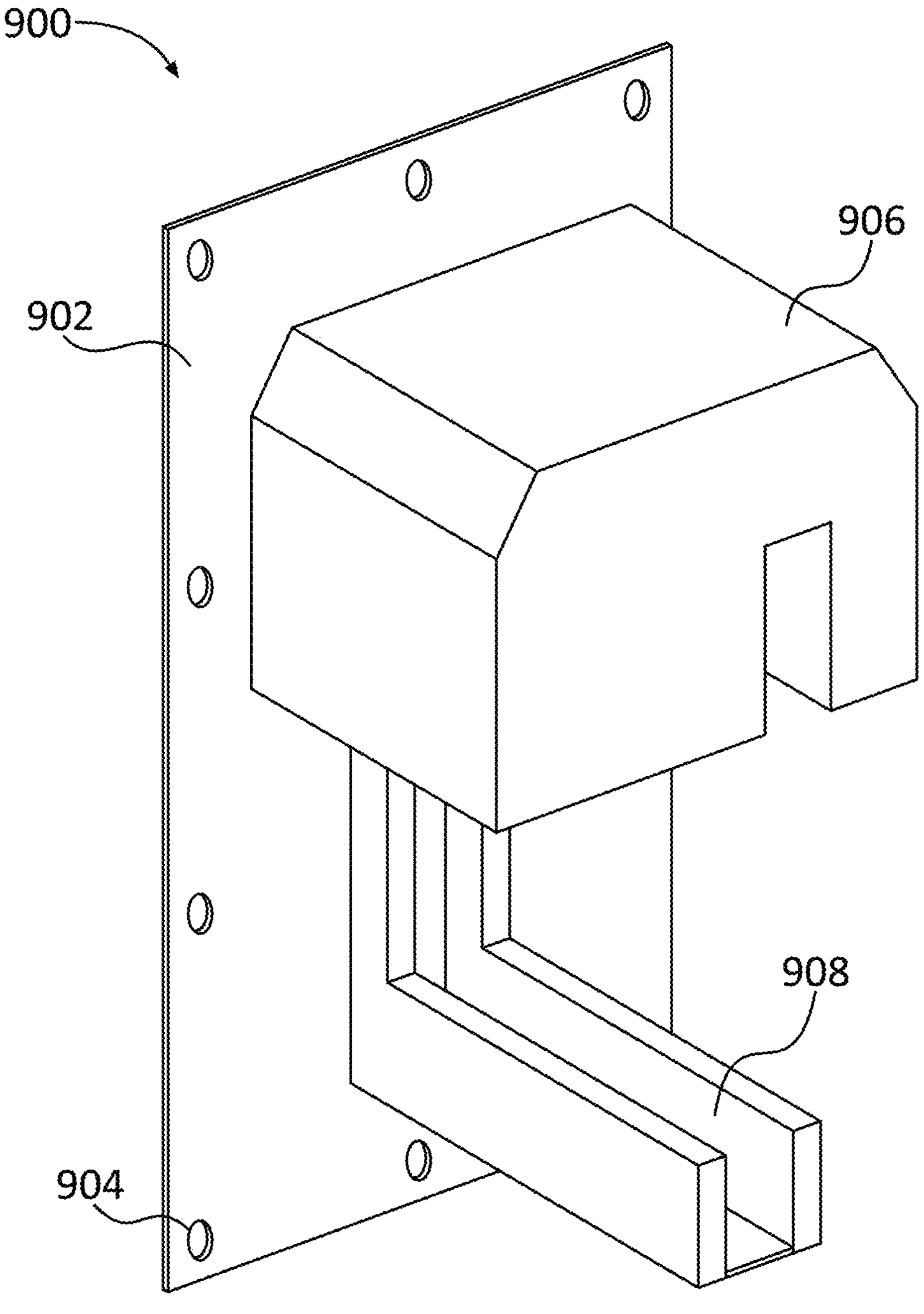
FIG. 9A is a perspective view illustrating one embodiment of a payment receiver cover of a system for a refueling station protective door cover.
Figure 9B:
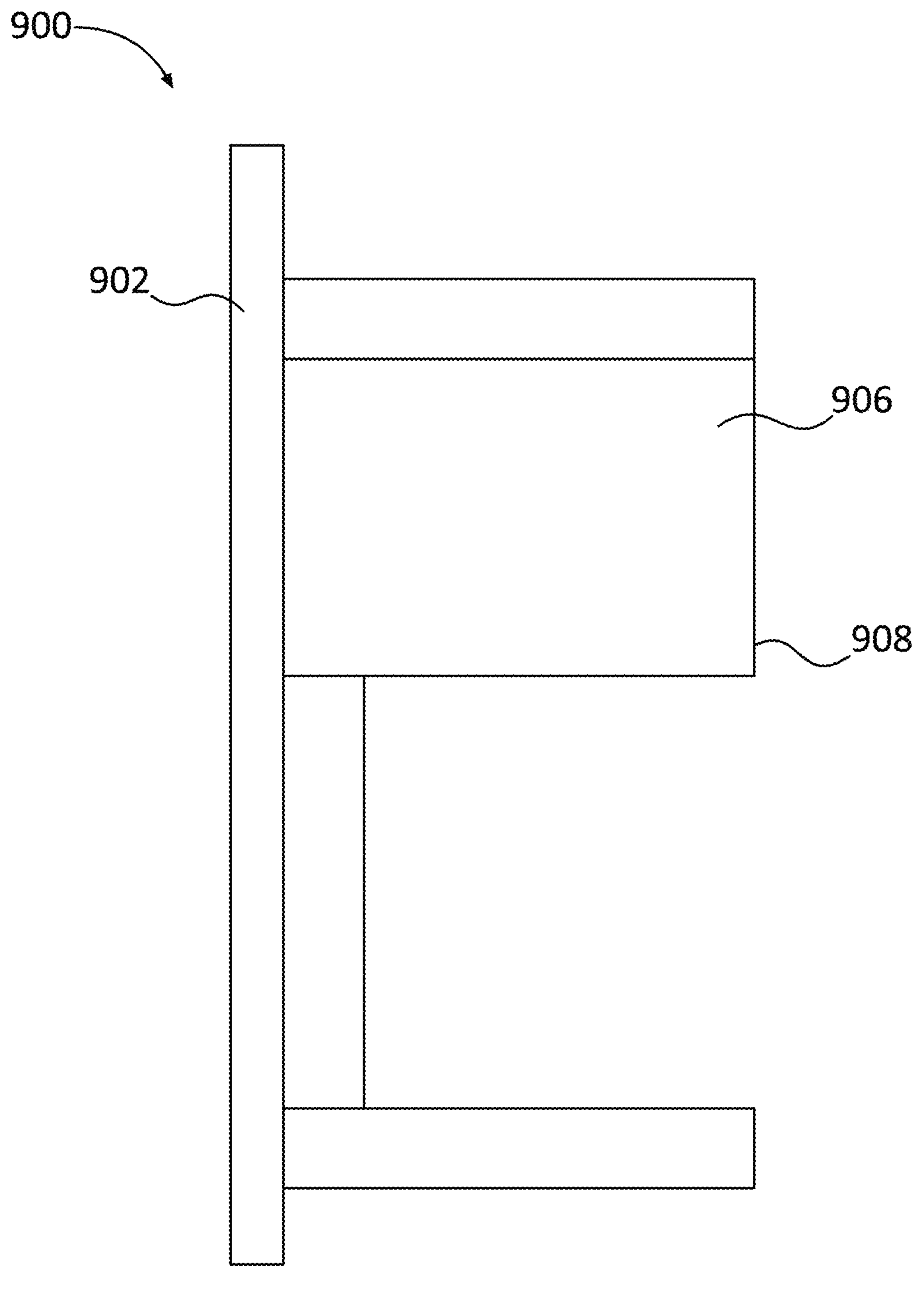
FIG. 9B is a side view illustrating one embodiment of a payment receiver cover of a system for a refueling station protective door cover.
Figure 9C:
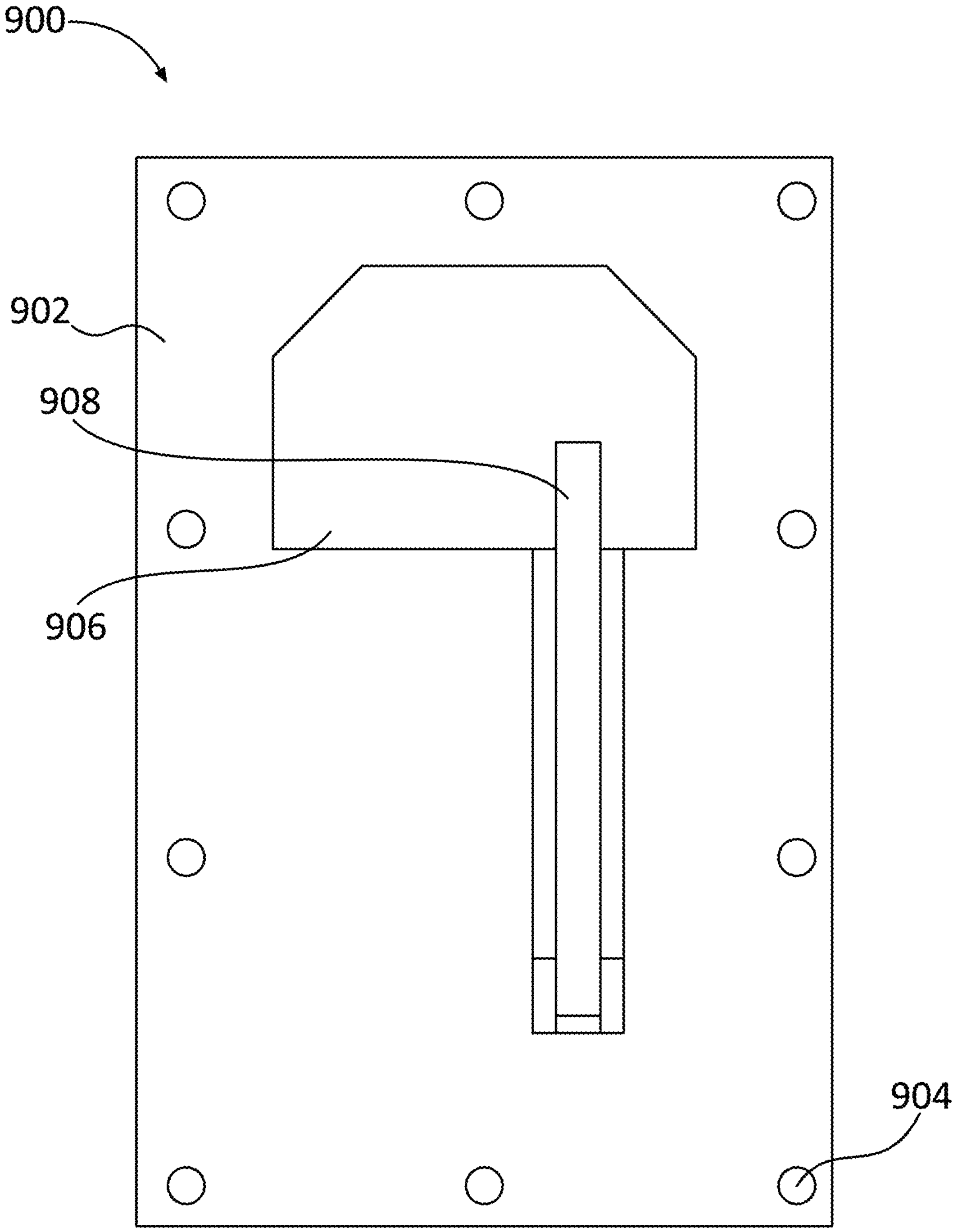
FIG. 9C is a front view illustrating one embodiment of a payment receiver cover of a system for a refueling station protective door cover.

FIGS. 9A-9C depict embodiments of a payment receiver cover 900. The payment receiver cover 900 may include a surface cover 902. The payment receiver cover 900 may include one or more apertures 904. The payment receiver cover 900 may include a receiver protector 906. The payment receiver cover 900 may include a slot 908. The payment receiver cover 900 may be disposable over a payment receiver 124 of the refueling station 100. The payment receiver cover 900 may protect against devices that may compromise the security of the payment receiver 124 (e.g., a payment card skimmer).

In some embodiments, the surface cover 902 may include a substantially flat surface. The one or more apertures 904 may be similar to the apertures 404 of FIGS. 4A-4D, the apertures 508 of FIGS. 5A-5D, or the apertures 604 of FIGS. 6A-6D and may allow the payment receiver cover 900 to be secured to the refueling station 100. In one embodiment, the receiver cover 906 may include one or more structures that may fit around a payment receiver 124 to in order to restrict access to the payment receiver 124 from one or more angles. For example, as depicted in FIG. 9A, the receiver protector 906 may include a block of material. The block of material may be sized and shaped to fit over a payment receiver 124. The block of material may include a square shape, rectangle shape, rounded shape, a polygonal shape, or some other shape. In some embodiments, the block of material may extend away from the surface cover 902. In other embodiments, the block of material may be flush with the cover surface 902 (e.g., in response to the payment receiver 124 being recessed in the refueling station 100.

In one embodiment, the slot 908 may be disposed in the block of material of the receiver protector 906. In some embodiments, the slot 908 may be disposed in the surface cover 902. The slot 908 may be sized and shaped to receiver a payment card, paper money, coins, or some other payment method.

Figure 10:
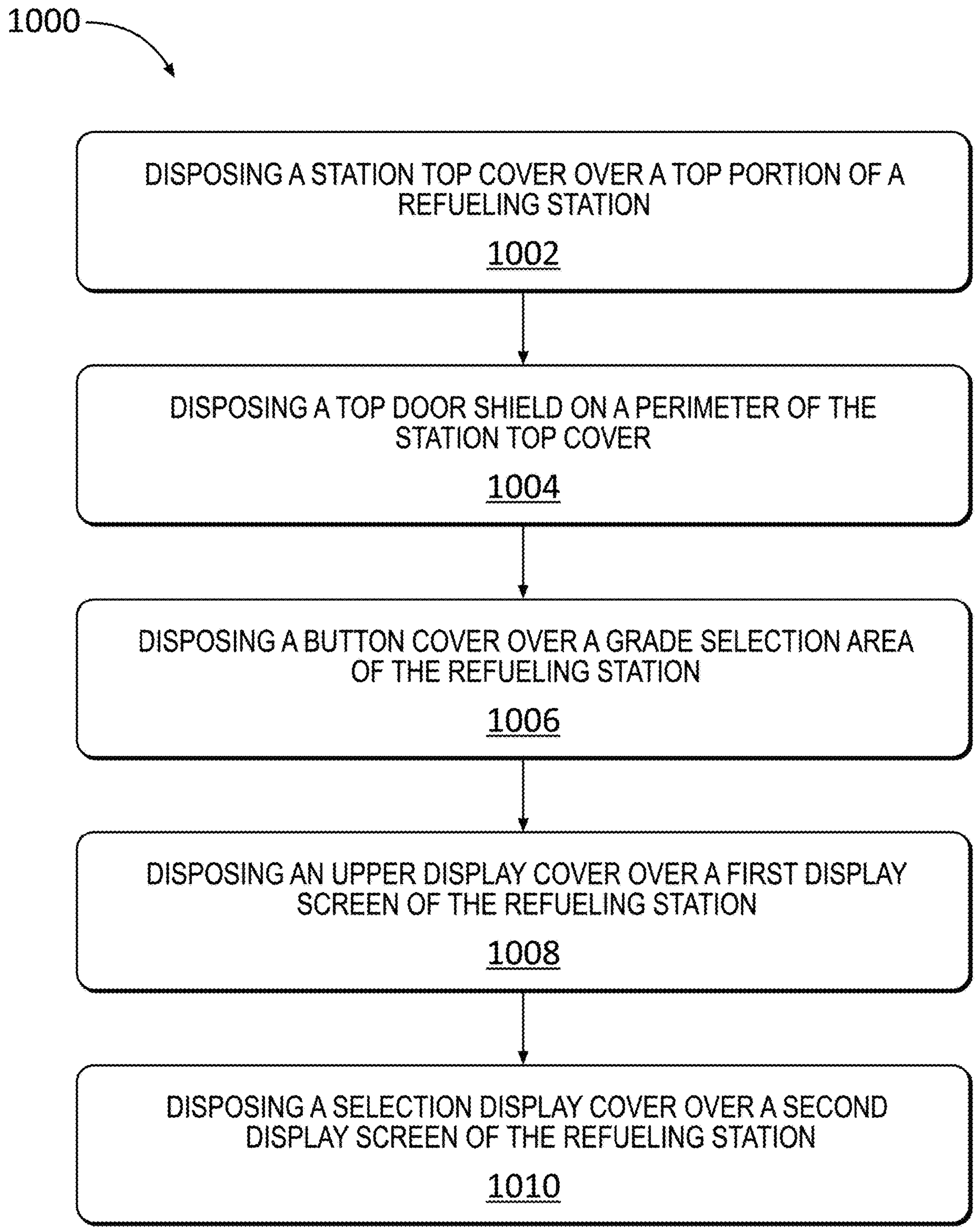
FIG. 10 is a flowchart illustrating one embodiment of a method for assembling a refueling station protective door cover.

FIG. 10 depicts one embodiment of a method 1000. The method 1000 may include a method for assembling a refueling station protective door cover apparatus. The method 1000 may include disposing a station top cover 400 over a top portion of a refueling station 100 (step 1002). The station top cover 400 may include a substantially flat surface 402. The method 1000 may include disposing a top door shield 500 on a perimeter of the station top cover 400 (step 1004). The top door shield 500 may include a raised shield 504. The method 1000 may include disposing a button cover 600 over a grade selection area 128 of the refueling station 100 (step 1006). The button cover 600 may include a substantially flat surface 602 and one or more button protectors 606 disposed in the substantially flat surface 602 of the button cover 600. The method 1000 may include disposing an upper display cover 700 over a first display screen 116 of the refueling station 100 (step 1008). The upper display cover 700 may include a first display protector 708 disposed in a central portion of the upper display cover 700. The method 1000 may include disposing a selection display cover 800 over a second display screen 120 of the refueling station 100 (step 1010). The selection display cover 800 may include a second display protector 808 disposed in a central portion of the upper display cover 800.

In some embodiments, the method 1000 may include providing the refueling station 100. The method 1000 may include shipping the refueling station 100, with one or more components of the system 300 disposed on the refueling station 100, to another location. The method 1000 may include removing the components of the system 300 disposed from the refueling station 100. The method 1000 may include other actions or steps disclosed herein or may use other components disclosed herein.

Thus, although there have been described particular embodiments of the present disclosure of a new and useful FUEL PUMP PROTECTIVE DOOR COVER, it is not intended that such references be construed as limitations upon the scope of this disclosure.

What is claimed is:

1. A refueling station protective door cover apparatus, comprising:

a station top cover, including a substantially flat surface disposable over a top portion of a refueling station;

a top door shield disposable on a first perimeter of the station top cover, wherein the top door shield includes a raised shield;

a door cover shaped to fit over a door of the refueling station, the door cover having a transparent material and including a button cover, an upper display cover, a selection display cover, and one or more flanges shaped to engage with an outer portion of the refueling station; and one or more fasteners disposable on the door cover to secure the door cover to the refueling station, wherein the button cover is disposable over a grade selection area of the refueling station, wherein the button cover includes a substantially flat surface, and one or more button protectors disposed in the substantially flat surface of the button cover, wherein the upper display cover is disposable over a first display screen of the refueling station, and wherein the selection display cover is disposable over a second display screen of the refueling station.

2. The refueling station protective door cover apparatus of claim 1, wherein:

the substantially flat surface of the station top cover includes one or more apertures; and a fastener is disposable through at least one of the one or more apertures.

3. The refueling station protective door cover apparatus of claim 1, wherein the station top cover includes one or more overhangs disposed on a second perimeter of the station top cover.

4. The refueling station protective door cover apparatus of claim 1, wherein the raised shield of the top door shield includes a curved raised shield.

5. The refueling station protective door cover apparatus of claim 1, wherein the one or more button protectors includes at least three button protectors.

6. The refueling station protective door cover apparatus of claim 5, wherein the at least three button protectors includes at least six button protectors.

7. The refueling station protective door cover apparatus of claim 1, wherein each button protector of the one or more button protectors includes:

a top ledge disposed on an upper portion of the button protector;

a bottom ledge disposed on a lower portion of the button protector; and at least one side edge disposed on a side portion of the button protector.

8. The refueling station protective door cover apparatus of claim 7, wherein:

the one or more button protectors includes a first button protector and a second button protector;

the first button protector and the second button protector are disposed proximate each other; and the first button protector and the second button protector include a side edge in common of the at least one side edge.

9. The refueling station protective door cover apparatus of claim 1, wherein the upper display cover includes:

a substantially flat surface;

a display protector disposed in a central portion of the substantially flat surface of the upper display cover; and a raised bezel disposed around a perimeter of the display protector of the upper display protector.

10. The refueling station protective door cover apparatus of claim 9, wherein:

the upper display cover includes one or more apertures disposed in the substantially flat surface of the upper display cover; and the one or more apertures of the upper display cover are disposed over a speaker of the refueling station.

11. The refueling station protective door cover apparatus of claim 1, wherein the selection display cover includes:

a substantially flat surface;

a display protector disposed in a central portion of the substantially flat surface of the selection display cover; and a raised bezel disposed around a perimeter of the display protector of the selection display cover, wherein the raised bezel includes one or more button covers disposed in the raised bezel.

12. The refueling station protective door cover apparatus of claim 1, wherein the door cover further includes a payment receiver cover having:

a surface cover disposable over a payment receiver of the refueling station;

a receiver protector disposed on the surface cover; and a slot formed in the receiver protector.

13. A refueling station protective door cover apparatus, comprising:

a station top cover, including a substantially flat surface disposable over a top portion of a refueling station, wherein the refueling station includes a first side and a second side disposed opposite the first side;

a first top door shield disposable on a first side of a perimeter of the station top cover, wherein the first side of the perimeter of the station top cover is disposed proximate the first side of the refueling station, and the first top door shield includes a first raised shield;

a second top door shield disposable on a second side of the perimeter of the station top cover, wherein the second side of the perimeter of the station top cover is disposed proximate the second side of the refueling station, and the second top door shield includes a second raised shield;

a door cover shaped to fit over a door of the refueling station, the door cover having a transparent material and including a plurality of button covers, a plurality of upper display covers, a plurality of selection display covers, and one or more flanges shaped to engage with an outer portion of the refueling station; and one or more fasteners disposable on the door cover to secure the door cover to the refueling station, wherein the plurality of button covers includes a first button cover disposable over a grade selection area of the first side of the refueling station, wherein the first button cover includes a substantially flat surface, and one or more button protectors disposed in the substantially flat surface of the first button cover, wherein the plurality of button covers further includes a second button cover disposable over a grade selection area of the second side of the refueling station, wherein the second button cover includes a substantially flat surface, and one or more button protectors disposed in the substantially flat surface of the second button cover, wherein the plurality of upper display covers includes a first upper display cover disposable over a first display screen of the first side the refueling station, wherein the plurality of upper display covers further includes a second upper display cover disposable over a first display screen of the second side the refueling station, wherein the plurality of selection display covers includes a first selection display cover disposable over a second display screen of the first side of the refueling station, and wherein the plurality of selection display covers further includes a second selection display cover disposable over a second display screen of the second side of the refueling station.

14. The refueling station protective door cover apparatus of claim 13, wherein each of the first upper display cover and the second upper display cover include:

a display protector disposed in a central portion of the respective upper display cover; and a raised bezel disposed around a perimeter of the respective display protector.

15. The refueling station protective door cover apparatus of claim 13, wherein each of the first upper display cover and the second upper display cover include one or more apertures disposed over a speaker of the refueling station.

16. The refueling station protective door cover apparatus of claim 13, wherein each of the first selection display cover and the second selection display cover include:

a display protector disposed in a central portion of the respective selection display cover; and a raised bezel disposed around a perimeter of the respective selection display protector, and wherein each raised bezel includes one or more button covers disposed in the raised bezel.

17. A method for assembling a refueling station protective door cover apparatus, comprising:

disposing a station top cover over a top portion of a refueling station, wherein the station top cover includes a substantially flat surface;

disposing a top door shield on a perimeter of the station top cover, wherein the top door shield includes a raised shield;

providing a door cover having a transparent material and including a button cover, an upper display cover, a selection display cover, and one or more flanges shaped to engage with an outer portion of the refueling station;

positioning the one or more flanges about an outer portion of the refueling station;

disposing the button cover over a grade selection area of the refueling station, wherein the button cover includes a substantially flat surface, and one or more button protectors disposed in the substantially flat surface of the button cover;

disposing the upper display cover over a first display screen of the refueling station, wherein the upper display cover includes a first display protector disposed in a central portion of the upper display cover;

disposing the selection display cover over a second display screen of the refueling station, wherein the selection display cover includes a second display protector disposed in a central portion of the upper display cover; and disposing one or more fasteners on the door cover to secure the door cover a door of the refueling station.

* * * * *